(12) United States Patent
Wilson et al.

(10) Patent No.: US 9,982,095 B2
(45) Date of Patent: May 29, 2018

(54) SUBSTITUTED ORGANOPOLYSILOXANES AND USE THEREOF

(75) Inventors: John Robert Howe Wilson, Oxford (GB); Alice Caroline Sullivan, London (GB); Siud Pui Man, Oxford (GB)

(73) Assignee: PhosphonicS Ltd, Oxford (GB)

( * ) Notice: Subject to any disclaimer, the term of this patent is extended or adjusted under 35 U.S.C. 154(b) by 1932 days.

(21) Appl. No.: 11/659,329

(22) PCT Filed: Jul. 26, 2005

(86) PCT No.: PCT/EP2005/008189
§ 371 (c)(1),
(2), (4) Date: Oct. 28, 2008

(87) PCT Pub. No.: WO2006/013060
PCT Pub. Date: Feb. 9, 2006

(65) Prior Publication Data
US 2009/0098082 A1 Apr. 16, 2009

(30) Foreign Application Priority Data

Aug. 4, 2004 (GB) .................................. 0417345.6
Dec. 4, 2004 (GB) .................................. 0426622.7

(51) Int. Cl.
*C08G 77/28* (2006.01)
*C08G 77/50* (2006.01)

(52) U.S. Cl.
CPC ............. *C08G 77/28* (2013.01); *C08G 77/50* (2013.01)

(58) Field of Classification Search
None
See application file for complete search history.

(56) References Cited

U.S. PATENT DOCUMENTS 2,500,543 A * 3/1950 Hall .............................. 426/545
4,005,046 A 1/1977 Chandra et al.
(Continued)

FOREIGN PATENT DOCUMENTS

EP 0765897 A 4/1997
JP 51-071291 A 6/1976
(Continued)

OTHER PUBLICATIONS

Bauduin et al. Langmuir, 2005, 21 (15), pp. 6769-6775.*
(Continued)

*Primary Examiner* — Nissa Westerberg

(74) *Attorney, Agent, or Firm* — Oblon, McClelland, Maier & Neustadt, L.L.P.

(57) ABSTRACT

The invention relates to new compounds of Formula 1:

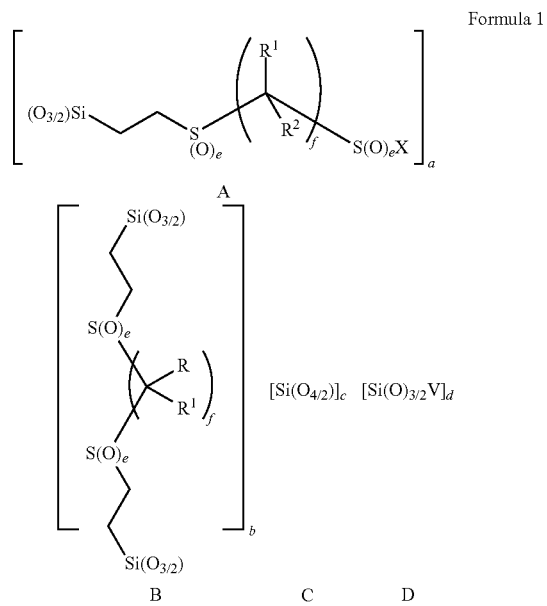

wherein R, $R^1$, are each independently hydrogen, a linear or branched $C_{1-40}$ alkyl, $C_{2-40}$-alkenyl or $C_{2-40}$-alkynyl group, an aryl or $C_{1-40}$-alkylaryl group; X is H, OH, $O(M'')_{1/n}$ or $R^4$ where M is a metal ion derived from a lanthanide, actinide, main group or transition metal and V is a substituted $C_{1-40}$-alkyl, $C_{2-40}$-alkenyl or $C_{2-40}$-alkynyl group or an aryl group or $C_{1-40}$-alkylaryl sulfide, sulfoxide, sulfone, amine or a polyalkyl amine or phosphine or other phosphorous containing group; $R^4$ is a linear or branched $C_{1-40}$ alkyl, $C_{2-40}$-alkenyl or $C_{2-40}$-alkynyl group, an aryl or $C_{1-40}$-alkylaryl group; e is an integer from 0 to 2; f is an integer from 1 to 100; n is an integer from 1 to 4: the free valences of the silicate oxygen atoms are saturated by one or more of: silicon atoms of other groups of Formula 1, hydrogen, a linear or branched $C_{1-12}$-alkyl group or by cross-linking bridge members or by polymer chains $(R^2)_2Si(OR^3)_1O_{1/2}$ or $(R^2)_2SiO_{2/2}$ or $(R^2)_3SiO_{1/2}$ or $R^2_qTi(OR^3)_mO_{k/2}$ or $Al(OR^3)_{3-p}O_{p/2}$ or $R^2Al(OR^3)_{2-r}O_{r/2}$; where $R^3$ is a linear or branched $C_{1-12}$-alkyl group; and $R^2$ is a linear or branched $C_{1-6}$-alkyl group; k is an integer from 1 to 4 and q is an integer from 0 to 3 and m is an integer from 0 to 3; such that m+k+q=4; p is an integer from 1 to 3; and r is an integer from 1 to 2: a, b, c and d are integers such that the ratio of a:b varies from 0.00001 to 100,000 and in the formula $A_aB_bC_cD_d$ where A represents $[O_{3/2}SiCH_2CH_2S(O)_e(CRR^1)_fS(O)_eX]$, B represents $[(O_{3/2}SiCH_2CH_2S(O)_e(CRR^1)_fS(O)_eCH_2CH_2Si(O_{3/2})]$, C represents $[O_{4/2}Si]$ and D represents $[O_{3/2}SiV]$ both A and B are always present. The compounds are useful as scavengers for the removal of unwanted organic and inorganic compounds, for solid phase extraction, for solid phase synthesis, for catalysis, for metal ion abstraction and for the immobilisation of bio-molecules.

(Continued)

In addition, the compounds have high chemical and thermal stability, fixed and rigid structures, are insoluble in organic solvents, high resistance to ageing, and can easily be purified and reused.

23 Claims, No Drawings

(56) References Cited

U.S. PATENT DOCUMENTS

| | | | | |
|---|---|---|---|---|
| 5,175,325 | A | * | 12/1992 | Brown .................. B01J 31/124 556/136 |
| 5,506,091 | A | * | 4/1996 | Suzuki et al. ................ 430/324 |
| 5,739,238 | A | | 4/1998 | Petty et al. |
| 6,387,518 | B1 | * | 5/2002 | Wolfer et al. ................ 428/447 |
| 2002/0002220 | A1 | * | 1/2002 | Reedy et al. .................. 524/82 |
| 2003/0050458 | A1 | * | 3/2003 | Bruening ........... C12N 15/1006 536/23.1 |
| 2003/0055139 | A1 | | 3/2003 | Cruse |
| 2003/0064320 | A1 | * | 4/2003 | Hanabata et al. ......... 430/270.1 |
| 2003/0199619 | A1 | | 10/2003 | Cruse |

FOREIGN PATENT DOCUMENTS

| | | |
|---|---|---|
| JP | 54-148100 A | 11/1979 |
| JP | 9-110989 A | 4/1997 |
| JP | 10-225638 A | 8/1998 |
| WO | 2003/091314 A | 11/2003 |

OTHER PUBLICATIONS

Chujo et al. Macromolecules 22(5), p. 2040-2043, 1989.*
Office Action dated Jul. 23, 2011, in the corresponding Japanese Patent Application No. 2007-524235, with English Translation.

* cited by examiner

SUBSTITUTED ORGANOPOLYSILOXANES AND USE THEREOF

The invention relates to new organopolysiloxanes and their use for example as heterogeneous catalysts, catalyst supports, cation and anion exchangers, organic and inorganic compound scavengers, solid phase purification or extraction materials, immobilisation materials for bio-molecules, anti-microbial agents, hydrophilicity modifiers, flameproofing agents, antistatic agents; coatings for bio-medical devices, water repellent films and coatings, solid phase synthesis materials and chromatography materials. The invention also relates to precursors of these new products and processes for their production.

The use of functionalised solids is growing rapidly for many different applications such as solution phase synthesis, solid phase synthesis, solid phase extraction, catalysis, catalyst supports, product purification and the immobilisation of bio-molecules. In these applications the advantages of functionalised solids are ease of manipulation, simple separation from the rest of the medium by filtration and regeneration and reuse. Key requirements for these functionalised solids are excellent physical and chemical stability over a wide range of operating conditions, broad solvent applicability, fast kinetics—fast and easy access to the functional groups and functional groups with high intrinsic activity for the desired application. In addition the preparation of these functionalised materials has to be simple from readily available reagents. Finally it is highly advantageous if the functional groups can be readily transformed into different functionalised materials that can be used for other applications.

As a consequence of stricter environmental regulations there is a growing requirement for more effective systems for the removal and recovery of toxic and hazardous chemicals from many sources including a wide spectrum of contaminated products, active pharmaceutical ingredients (API), solvents, potable water and aqueous based wastes and from contaminated waters. For example the electronics industry has a particular need for ultra pure water with very low levels of both cations and anions. Other industries such as the nuclear industry and the electroplating industry generate substantial quantities of water-based effluent that are heavily contaminated with undesirable metal ions. In the pharmaceutical industry metal catalysts are increasing being used in the manufacture of APIs or their intermediates. Given the toxicity of these metals very low residual levels have to be achieved in the API. In the preparation of compound libraries for biological evaluation simple and quick processes are required to purify reaction mixtures in order to screen thousands of compounds to identify leads for optimisation and development programmes.

Substituted polystyrene derivatives are an important class of materials being used for a range of applications. The chemical and physical properties of a variety of such polystyrene based systems are described in the Bio-Rad Life Science Research Products catalogue 1998/99, pages 56-64. However the physical and chemical properties of these polystyrene resins may possess disadvantages, for example poor chemical stability and thermal stability, believed to be due to the organic polymeric backbone. Additional problems for example swelling and shrinking in organic solvents as well as the production of highly coloured unwanted side products may also be encountered. Generally, due to their poor thermal stability, these polystyrene resins cannot be used for any length of time above 80° C., thus limiting their general applicability. In addition a range of chemical functionality cannot be readily attached to these organic polymers due to the physical limitations of these polymers and the range of chemistry that can be used to attache functional groups onto the aromatic rings.

Inorganic polymer systems such as silica, aluminium oxide and titanium oxide have also been disclosed as functionalised materials. Active functional groups or metals can be attached by a variety of means to these systems. However a number of problems may be encountered where the functional groups are only physically adsorbed for example low functional group loading along with limitations in the range of solvents that can be used and removal of the functional groups on use or on standing. This is believed to be due to the rather weak attachment between the functional group and the surface atoms on the support. Building the functional group into the framework may provide a more robust material and may also permit higher functional group loadings. However in this approach there is a significant lack of readily available starting materials as well as precursors for preparing such starting materials. In addition there are limited synthetic methodologies for the preparation of suitable starting materials from available precursors. A need exists to provide new synthetic methods as well as starting compounds in order to make such functionalised materials.

Functionalised solid materials are used in solution phase organic synthesis to aid rapid purification and workup. These materials, also known as scavengers, may remove excess reagents and side products. Typically, a scavenger is added to a solution to quench and selectively react with excess or unreacted reagents and reaction side products. The unwanted chemicals now attached to the functionalised materials are removed by simple filtration. This simple process circumvents the standard purification methodologies of liquid-liquid extraction, chromatography and crystallisation. Substituted polystyrene derivatives are known for use as scavengers but have a number of limitations such as lack of thermal stability, swelling and shrinking in organic solvents and a limited range of functional groups.

In solid phase synthesis substituted polystyrene derivatives are the main class of materials being used and likewise these materials suffer the same limitations as described above. The use of functionalised silica materials for this application is limited by the availability of suitable functionalised materials.

Due to their toxicity there is a growing requirement for more effective systems for the removal and recovery of cations and anions including a wide spectrum of contaminated products, active pharmaceutical ingredients (API), solvents, potable water and aqueous based wastes and from contaminated waters. Polymers having an organic, partly cross-linked polystyrene backbone with sulfonate groups attached to some of the phenyl rings are known for use as cation exchangers for removing metal ions from solution. The physical and chemical stability and other properties of these materials for example due to the organic nature of the polymeric backbone, may adversely affect their use in cation exchange applications. Organophosphonic acid cation exchangers have also been reported in U.S. Pat. Nos. 5,281,631 and 5,449,462. The feedstock in the manufacture of these materials may be expensive and they have limited applicability due to their physical and chemical properties.

Strong acidic cation exchangers based on sulfonic acid groups attached to a organopolysiloxane backbone have been described in U.S. Pat. Nos. 4,552,700 and 5,354,831. The reported materials have a general formula of $(O_{3/2}Si-R^1-SO_3^-)_xM^x$ where $R^1$ is an alkyl or cycloalkyl fragment, M is hydrogen or a mono to tetravalent metal ion and where the free valences of the oxygen atoms being saturated by silicon atoms of other groups of this formula and/or by cross-linking bridge members such as $SiO_{4/2}$, $R^1SiO_{3/2}$, $TiO_{4/2}$, $AlO_{3/2}$, etc. Whilst these materials can act as cation exchangers it is generally recognised that sulfonic acid groups are limited in their effectiveness to complex with a range of metals and in comparison to other functional groups. In addition the sulfonate group is also limited by the fact that it is a mono anion and thus more of these functional groups are needed to bind to di and multivalent metal ions compared to other functional groups. These materials are also expensive to prepare. In our earlier patent application PCT/GB 0200069 we reported on organopolysiloxanes containing phosphonic groups. These materials demonstrate high intrinsic activity for the removal of metal ions. A range of other functionalised materials is needed particularly to separate specific metal ions from various environments.

Anions such as arsenates, chromates, permanganates, borates and perchlorates pose many significant problems to the environment and health. For example arsenates, chromates and permanganates are highly toxic and so their concentrations in water or other medium has to be very carefully controlled. New materials with very high affinity for such anions are needed in order to achieve very low acceptable limits.

Precious metal mediated reactions enable the organic chemist to conduct a wide range of reactions used in the manufacture of products for a number of industries. Typical reactions include Suzuki, Heck, oxidations and reductions and metals and their complexes such as platinum, palladium and rhodium are extensively used. A major problem encountered with the use of these systems is the significant loss of these expensive and highly toxic metals. Furthermore in the production of active pharmaceutical agents (APIs) using such metal mediated reactions, it is found that the metal invariably complexes to the desired API and residual metal contents in the range of 600-1000 ppm are not uncommon. The current target for palladium, platinum, rhodium and nickel is less than 5 ppm. Various methods have been tried to reduce the residual palladium content, most unsuccessfully. Selective re-crystallisation leads to only a slight lowering of metal content. A lower yield of the API is a significant unwanted side effect of this process. Attempts to reposition the precious metal catalysed reaction from the final to an earlier step leads also to a slight but not significant lowering of metal content. Attempts to pass a solution of the API through a medium containing a metal exchanger such as a functionalised polystyrene resin have also been largely unsuccessful. Alternative and more costly processes have been tried—washing with an aqueous solution of a suitable metal chelator. A number of such reagents have been used with only limited success. Thus there is a need to design new functionalised materials that have very high affinity for precious metals and can readily remove them from tightly bound complexes. Furthermore given the structural diversity of APIs it is necessary to have a range of functionalised materials with different structures and high affinity in order to provide an effective solution.

Catalysts are utilised in the chemical and biochemical industry to conduct a wide range of chemical transformations. A range of homogenous and heterogeneous catalysts are used some of which require high temperatures to be effective and some produce considerable amount of bi-products and waste. These unwanted products and waste have to be treated and destroyed. The drive for more environmentally friendly processes—Green Chemistry—highlights the need for reusable, more effective and selective catalysts. Examples of such reagents currently used extensively across manufacturing industries include mineral acids—sulphuric acid, hydrochloric acid, hydrogen fluoride, phosphoric acid—Lewis acids—aluminium trichloride, boron trifluoride and zinc chloride—and oxidation reagents—permanganate, manganese dioxide and chromium (VI). This need has led to investigations into the design of new solid phase materials that can catalyse a variety of chemical transformations. Key requirements for such new catalysts are very good thermal stability, high insensitivity to chemical attack, high and tailored functional group loading, fixed and rigid structures, optimum functional groups so as to avoid rearrangements and side products, limited swelling capability, insolubility in organic solvents, ease of purification and high reusability, high ageing resistance and ease of access to the functional group which conducts the chemical transformation. A particular requirement for acid catalysed reactions is to have suitable functional groups attached to an inert support that possess the right level of acidity to catalyse the desired reaction without producing a range of side products and highly discoloured products. For example, whilst both sulfuric acid and heterogeneous sulfonic acids are effective acid catalysts they also invariable produce a range of highly coloured unwanted side products that have to be removed. Further requirements are for heterogeneous oxidation catalysts as well as for carbon carbon bond formation that do not leach the metal ions into the products or waste streams.

The inventors have discovered a class of compounds which have a desirable combination of characteristics and make them suitable for use in a range of applications including acting as scavengers for inorganic and organic compounds, solid phase purification or extraction materials, ion exchange materials, catalysts, catalyst immobilisation supports, immobilisation materials for bio-molecules, anti-microbial agents, hydrophilicity modifiers, flameproofing agents, antistatic agents, solid phase synthesis materials and chromatography materials, or which are precursors for these.

In a first aspect of the present invention, there is provided a compound of General Formula 1:

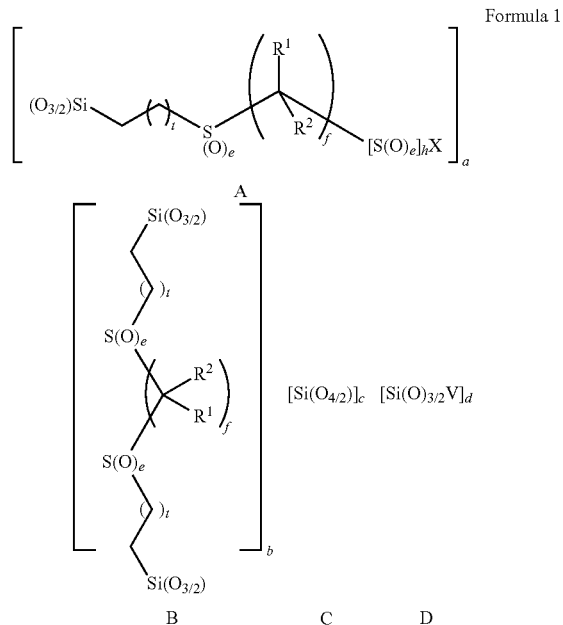

wherein X is selected from $R^1$, a group —$[CO_2(CH_2)_n CO_2]$— linking two moieties $A^1$, $A^1$ being moiety A without X and n being 2 to 4, C(=W)R, (CR$^3$Z)$_i$CHR$^3$Z, OH, O(M$^{+g}$)$_{1/g}$ and OC(=W)R where W is selected from oxygen, sulfur, NR$^4$ and NNR$^4$R$^5$, Z is selected from OR$^6$, NR$^6$R$^7$ and SR$^6$, R is selected from R$^6$, OR$^6$, O(M$^{+g}$)$_{1/g}$, NR$^6$R$^7$, NHNR$^6$R$^7$ and SR$^6$ and R$^1$, R$^2$, R$^3$, R$^4$, R$^5$, R$^6$ and R$^7$ are each selected from hydrogen, an optionally substituted linear or branched C$_{1-40}$-alkyl, C$_{2-40}$-alkenyl or C$_{2-40}$-alkynyl group, an aryl and a C$_{1-40}$-alkylaryl group; M is a metal ion derived from a lanthanide, actinide, main group or transition metal and V is an optionally substituted C$_{1-40}$-alkyl, C$_{2-40}$-alkenyl or C$_{2-40}$-alkynyl group or an aryl group or C$_{1-40}$-alkylaryl sulfide, sulfoxide, sulfone, amine or a polyalkyl amine or phosphine or other phosphorous containing group; e is an integer from 0 to 2; f is an integer from 0 to 100, preferably 1 to 100, g is an integer from 1 to 4, i is an integer from 0 to 6, t is an integer from 1 to 20, preferably 1 to 3; and h is 0 or 1:

the free valences of the silicate oxygen atoms are saturated by one or more of:

silicon atoms of other groups of Formula 1, hydrogen, a linear or branched C$_{1-12}$-alkyl group or by end groups R$^8{}_3$M$^1$O$_{1/2}$ or by cross-linking bridge members or by polymer chains R$^8{}_q$M$^1$(OR$^9$)$_m$O$_{k/2}$ or Al(OR$^9$)$_{3-p}$O$_{p/2}$ or R$^8$Al(OR$^9$)$_{2-r}$O$_{r/2}$; where M$^1$ is Si or Ti;

R$^9$ is a linear or branched C$_{1-40}$, an aryl or C$_{1-40}$-alkylaryl group; and R$^8$ is a linear or branched C$_{1-40}$-alkyl group or an aryl or C$_{1-40}$-alkylaryl group;

k is an integer from 1 to 3 and q is an integer from 1 to 2 and m is an integer from 0 to 2;

such that m+k+q=4;

p is an integer from 1 to 3; and r is an integer from 1 to 2;

or other known oxo metal bridging systems where the metal is zirconium, boron, magnesium, iron, nickel or a lanthanide and the integers a, b, c and d are such that i) when b is 0 the ratio of a:c is from 0.00001 to 100,000 and in the formula A$_a$B$_b$C$_c$D$_d$ both A and C are always present, and ii) when b is 1 or more the ratio of a:b is from 0.00001 to 100,000 and in the formula A$_a$B$_b$C$_c$D$_d$ both A and B are always present.

Where an end group and/or cross linker and/or polymer chain is used, it is preferred that the ratio of end group, cross linker or polymer chains to a+b+c+d is from 0 to 999:1 and preferably 0.001 to 999:1.

Advantages of the new scavengers for inorganic and organic compounds, solid phase extraction or purification materials, catalysts, catalyst immobilisation supports, biomolecule immobilisation supports, anti-microbial agents, hydrophilicity modifiers, flameproofing agents, antistatic agents, solid phase synthesis materials and chromatography materials, and ion exchanger materials based on compounds of Formula 1 include high intrinsic activity of particular functional groups for specific applications and that the functional group or groups can be tuned to have either a high or low level of loading according to the requirements of the user. Other advantages include high thermal stability, fixed and rigid structures, good stability to a wide range of chemical conditions, insolubility in organic solvents, high resistance to ageing, easily purified and high reusability. In addition the processes for the preparation of compounds of Formula 1 are very flexible, allowing a wide range of functionalised materials to be made from a small number of common intermediates and also the porosity of the materials can be varied from micro to macro porous and the loading of the functional groups as well as the other substituents in the fragment V to be varied as needed. Compounds of Formula 1 have the added advantage of their respective functional groups being firmly attached to a very stable and inert medium. Furthermore compounds of Formula 1 have the added advantages of a very high affinity for both cations and anions coupled with fast kinetics thus enabling very rapid removal of toxic compounds or impurities to very low levels. In addition compounds of Formula 1 can be used as heterogeneous catalysts to conduct a number of chemical transformations and posses the key advantages of being easily separated from the reaction mixture by filtration and also of being recycled and reused.

The optionally substituted linear or branched group selected from C$_{1-40}$-alkyl, C$_{2-40}$-alkenyl, C$_{2-40}$-alkynyl group, an aryl and C$_{1-40}$-alkylaryl group, R$^{1-7}$ groups may independently be linear or branched and/or may be substituted with one or more substituents but preferably contain only hydrogen and carbon atoms. If a substituent is present, it may be selected from nitro, chloro, fluoro, bromo, nitrile, hydroxyl, carboxylic acids, carboxylic acid esters, sulfides, sulfoxides, sulfones, C$_{1-6}$-alkoxy, a C$_{1-40}$-alkyl or aryl di substituted phosphine, amino, amino C$_{1-40}$-alkyl or amino di (C$_{1-40}$-alkyl) or C$_{1-40}$-alkyl phosphinic or phosphonic group.

Preferably, the optionally substituted linear or branched group selected from C$_{1-40}$-alkyl, C$_{2-40}$-alkenyl, C$_{2-40}$-alkynyl group, an aryl and C$_{1-40}$-alkylaryl group, R$^{1-7}$ are independently selected from linear or branched C$_{1-22}$ and desirably C$_{1-12}$-alkyl, C$_{2-22}$- and desirably C$_{2-12}$-alkenyl, aryl and a C$_{1-22}$-alkylaryl group and it is especially preferred that these groups are independently selected from a linear or branched C$_{1-8}$-alkyl, C$_{2-8}$-alkenyl, aryl and a C$_{1-8}$-alkylaryl group.

Suitably groups R$^{1-7}$ are independently a C$_{1-6}$-alkyl group for example methyl or ethyl, or a phenyl group. Preferably q is from 0 to 2, k is from 1 to 3 and m is 0 provided that m+k+q=4.

Examples of suitable alkyl groups include methyl, ethyl, isopropyl, n-propyl, butyl, tert-butyl, n-hexyl, n-decyl, n-dodecyl, cyclohexyl, octyl, iso-octyl, hexadecyl, octadecyl, iso-octadecyl and docosyl. Examples of suitable alkenyl groups include ethenyl, 2-propenyl, cyclohexenyl, octenyl, iso-octenyl, hexadecenyl, octadecenyl, iso-octadecenyl and docosenyl.

C$_{1-6}$-alkoxy refers to a straight or branched hydrocarbon chain having from one to six carbon atoms and attached to an oxygen atom. Examples include methoxy, ethoxy, propoxy, tert-butoxy and n-butoxy.

The term aryl refers to a five or six membered cyclic, 8-10 membered bicyclic or 10-13 membered tricyclic group with aromatic character and includes systems which contain one or more heteroatoms, for example, N, O or S. Examples of suitable aryl groups include phenyl, pyridinyl and furanyl. Where the term "alkylaryl" is employed herein, the immediately preceding carbon atom range refers to the alkyl substituent only and does not include any aryl carbon atoms. Examples of suitable alkaryl groups include benzyl, phenylethyl and pyridylmethyl.

Compounds in which wherein X is independently selected from R$^1$, C(=W)R or (CR$^3$Z)$_i$CHR$^3$Z or OH or O(M$^{+g}$)$_{1/g}$ or OC(=W)R where W is oxygen and Z is OR$^6$, NR$^6$R$^7$ or SR$^6$ and R is R$^6$, OR$^6$, O(M$^{+g}$)$_{1/g}$, NR$^6$R$^7$, NHNR$^6$R$^7$ or SR$^6$ and R$^1$, R$^2$, R$^3$, R$^4$, R$^5$, R$^6$ and R$^7$ are each hydrogen, an optionally substituted linear or branched C$_{1-22}$-alkyl, C$_{2-22}$-alkenyl or C$_{2-22}$-alkynyl group, an aryl or C$_{1-22}$-alkylaryl group; M is a metal ion derived from a lanthanide, actinide, main group or transition metal and V is an optionally substituted C$_{1-22}$-alkyl, C$_{2-22}$-alkenyl or C$_{2-22}$-alkynyl group or an aryl group; e is an integer from 0 to 2; f is an integer from 1 to 10; g is an integer from 1 to 4; i is an integer from 0 to 6; t is an integer from 1 to 3; and h is 0 or 1, are preferred.

By way of example, some particularly preferred species for moiety A include $O_{3/2}SiCH_2CH_2SR^1$, $O_{3/2}SiCH_2CH_2SC_6H_4SO_3H$ and, $O_{3/2}SiCH_2CH_2SCH_2C_6H_4SO_3H$ as acid catalysts, $O_{3/2}SiCH_2CH_2SC_6H_4SO_2Cl$ for removing amines and alcohols from a process stream, $O_{3/2}SiCH_2CH_2SCH_2C_6H_4SO_3M^+$ for cation exchange, $O_{3/2}SiCH_2CH_2SH_2CH_2NR^6R^7$, and $O_{3/2}SiCH_2CH_2SCH_2CH_2OCH_2(CF_2)n'CHF_2$ where n' is 0 to 6.

Compounds of Formula 1 in which the free valences of the silicate oxygen atoms are saturated by one or more of silicon atoms of other groups of Formula 1, hydrogen, a linear or branched $C_{1-12}$-alkyl group or by end groups $R^8_3M^1O_{1/2}$ or by cross-linking bridge members or by polymer chains $R^8_qM^1(OR^9)_mO_{k/2}$ or $Al(OR^9)_{3-p}O_{p/2}$ or $R^8Al(OR^9)_{2-r}O_{r/2}$; where $M^1$ is Si or Ti in which $R^9$ is a linear or branched $C_{1-12}$, an aryl or $C_{1-12}$-alkylaryl group; and $R^8$ is a linear or branched $C_{1-12}$-alkyl group or an aryl or $C_{1-12}$-alkylaryl group; k is an integer from 1 to 3 and q is an integer from 1 to 2 and m is an integer from 0 to 2; such that m+k+q=4; p is an integer from 1 to 3; and r is an integer from 1 to 2; are preferred.

Where an end group and/or cross linker and or polymer chain is used, it is preferred that the ratio of end groups or cross linker or polymer chains to a+b+c+d varies from 0 to 99:1, preferably 0.01 to 99:1. Particularly suitable cross linkers or polymer chains are derived from titanium alkoxides, aluminium trialkoxides and alkyl alkoxy silanes. Examples of cross linkers include aluminium triethoxide, aluminium tributoxide and titanium isopropoxide and for polymer chains alkyl alkoxy silanes. The end group, cross linking bridge or polymer chain member is preferably $R^8_3M^1O_{1/2}$, $R^8_2SiO\ R^9O_{1/2}$, $(R^8)_2SiO_{2/2}$, $TiO_{4/2}$, $R^8TiO_{3/2}$, $(R^8)_2TiO_{2/2}$, $AlO_{3/2}$ or $R^8AlO_{2/2}$. $R^8$ and $R^9$ are preferably $C_{1-4}$-alkyl, especially methyl or ethyl.

The preparation of compounds of Formula 1 will now be discussed in greater detail. The general procedure used for the production of the compounds of Formula 1 comprises first forming the compounds $(R^9O)_3SiCH_2(CH_2)_tS(CR^1R^2)_fX$ and depending on the reagents and reaction conditions $(R^9O)_3SiCH_2(CH_2)_tS(CR^1R^2)_fS(CH_2)_tCH_2Si(OR^9)_3$ as well and then combining the former and the latter if present with tetraalkyl orthosilicate and with other compounds such as $(R^5O)_3SiV$, titanium alkoxides, aluminium trialkoxides and alkyl alkoxy silanes, in the desired ratios, in solvent with either dilute acid or base. Alternatively the surfaces of materials such as silica, aluminium oxide or carbon can be treated with $(R^9O)_3SiCH_2(CH_2)_tS(CR^1R^2)_fX$ or mixtures of $(R^9O)_3SiCH_2(CH_2)_tS(CR^1R^2)_fX$ and $(R^9O)_3SiCH_2(CH_2)_tS(CR^1R^2)_fS(CH_2)_tCH_2Si(OR^9)_3$ and if necessary with other compounds such as $(R^5O)_3SiV$, titanium alkoxides, aluminium trialkoxides and alkyl alkoxy silanes to give compounds of Formula 1. These materials can then be subsequently transformed using known chemistry.

There is a lack of simple and effective synthetic methodology for the preparation of functionalised organic or inorganic polymers or materials. For example there is a lack of simple and effective synthetic methodology for the preparation of readily transformed carbonyl, carboxy, thio or hydroxy functionalised organic or inorganic polymers or materials. Given the advantages of inorganic materials such as high thermal stability, fast kinetics and greater solvent compatibility there is a particular need for new simple synthetic methodologies for the preparation of functionalised inorganic materials.

An important desired property of functionalised materials is to be able to transform the functional group, attached to the surface via a stable bond, into different groups using known chemistry. These new functionalised materials can then be used for other applications or to optimise existing applications. A further advantage is that a wide range of different functionalised materials can be made from a limited number of intermediates. However a number of problems are encountered in the chemical transformation of surface attached functional groups. For example very long reaction times are often needed to conduct such chemical transformations of surface attached functional groups. These prolonged reaction conditions often result in the functional group being removed from the surface. In addition those reactions that do proceed very often do not go to completion leading to a mixture of products that cannot be separated. To circumvent these difficulties the inventors designed these new functionalised materials with specific additional functionality to enhance the chemical reactivity of these materials. In addition the inventors believed that this design would enhance the properties of the materials for a number of desired applications. The design involved the use of a neighbouring group to enhance the reactivity of the second functional group.

It is known that free radical reactions involving alkenes may not proceed in high yield or selectivity as, depending on the particular starting materials unwanted dimers and higher tellomers may undesirably be produced for example as disclosed in *Org. Reactions*, Vol. 13, page 218-222 and the references provided therein. In the original 1950's work mono substituted products and not mixtures were the desired target for use as fine chemicals. As a consequence of these side reactions interest in this area of chemistry waned. It has been reported that sulfides can be prepared through the free radical addition of thiols to double bonds. This is described in *Org. Reactions*. Vol. 13, 164-196. The majority of this work concerns the addition of thiols to simple alkyl substituted olefins. For silicon containing olefins there are a small number of examples that include the photochemical catalysed reaction of methyl thioglycolate with trimethoxy vinylsilane reported in *J. Gen. Chem.*, 1976, 46, 1013 to give $(RO)_3Si(CH_2)_2SCH_2CO_2R$. These compounds were investigated for pharmacological activity in a programme on atrane derivatives. Also it has been reported in the *Russ. J. Appl. Chem*, 1999, 72, 610-612 that the radical catalysed reaction of thioglycolic acid, $HSCH_2CO_2H$, to trimethoxy vinylsilane gives a complex mixture which on either acid or neutral treatment does not lead to a polymeric material. Strong base treatment followed by acidification was reported to give a polymeric material described as $[O_{1.5}Si(CH_2)_2SCH_2CO_2H]_n$. The sodium salts of this polymer are capable of removing both silver and gold ions but are ineffective for other metal ions.

Thus it was decided to explore the free radical addition of substituted thiols to vinyl trialkoxy silane to produce functionalised organopolysiloxanes with the desired physical and chemical properties for applications such as scavengers for the removal of unwanted chemical, as materials for solid phase synthesis, as materials for cation and anion recovery and removal, for solid phase purification and extraction, as catalysts and catalyst supports, as chromatography materials and for the immobilisation of bio-molecules.

Compounds such as $(R^9O)_3SiCH_2CH_2S(CR^1R^2)_fX$ were synthesised via a free radical promoted addition of a thiol HS(CR$^1$R$^2$)$_i$X to vinyl trialkoxy silane. R$^9$ is a linear or branched C$_{1-40}$-alkyl, C$_{2-40}$-alkenyl or C$_{2-40}$-alkynyl group, aryl or C$_{1-40}$-alkylaryl group. A wide range of free radical initiators can be used for this reaction and preferred are the peroxides and in particular the alkyl peroxides. Addition of a very small amount of the initiator every few hours improves the overall yield. Reaction temperatures between 20-170° C. can be used, though a reaction temperature of between 20-120° C. is preferred. Di-tert-butyl peroxide is the preferred free radical initiator. Reaction times of between 5 minutes to 48 hours have been used with ½ to 2 hours preferred.

Known sol-gel technology was used to produce the organopolysiloxanes of Formula 1. The state of the arts of sol-gel technology and the hydrolysis of silicon esters are described by M. A. Brook in *Silicon in Organic, Organometallic and Polymer Chemistry* Chapter 10, page 318, John Wiley & Sons, Inc., 2000, G. A. Scherer in *Sol-gel science: the physics and chemistry of sol-gel processing,* Boston: Academic Press, 1990, and J. D. Wright in *Sol-gel materials: chemistry and applications,* Amsterdam: Gordon & Breach Science Publishers, 2001and the references contained within. Acids and bases were used to catalyse the hydrolysis of the silicon esters of (R$^9$O)$_3$SiCH$_2$CH$_2$S(CR$^1$R$^2$)$_i$X or mixtures of (R$^9$O)$_3$SiCH$_2$CH$_2$S(CR$^1$R$^2$)$_i$X and (R$^9$O)$_3$SiCH$_2$CH$_2$S(CR$^1$R$^2$)$_i$SCH$_2$CH$_2$Si(OR$^9$)$_3$ and if necessary with other compounds such as (R$^9$O)$_3$SiV, and tetraalkyl orthosilicate to produce the organopolysiloxanes of Formula 1.

A range of solvents, well known to those skilled in the art of organic chemistry, can be used to conduct this reaction. Alcohols are the preferred solvents particularly methanol and ethanol. After standing for a period of time the solution can be warmed to speed up the formation of the glass. Ratios, by weight, of the alcohol solvent to the combined weight of the reagents from 100 to 0.01 can be used, with ranges from 2-10 being preferred. A range of acids can be used to aid hydrolysis with hydrochloric acid in concentrations ranging from 0.1 to 4 M being preferred. Hydrochloric acid, 1 molar, was routinely used. Ratios, from 0.000001 to 10, of hydrochloric acid, 1 molar, to the combined weight of the reagents can be used, with ranges from 0.0001 to 1 being preferred. In general the reaction mixture was left to stand at temperatures ranging from 0° C.-120° C. to aid hydrolysis and the formation of the Si—O—Si bonds. Temperatures between 20° C.-90° C. are preferred and warming is continued until all the solvent has evaporated and a clear glass is obtained.

In addition to the groups A, B, C and D, end groups, cross-linking bridge members or polymer chains such as (R$^8$)$_3$SiO$_{1/2}$ or R$^8$SiO$_{3/2}$ or (R$^8$)$_2$SiO$_{2/2}$ or TiO$_{4/2}$ or R$^2$TiO$_{3/2}$ or (R$^8$)$_2$TiO$_{2/2}$ or AlO$_{3/2}$ or R$^8$AlO$_{2/2}$, where R$^8$ is as defined above, but is preferably methyl or ethyl, or other oxo metals can be added in varying ratios to produce the desired compound of Formula 1. These end groups, cross linking bridge or polymer chain precursors are added at the same time as compounds (R$^9$O)$_3$SiCH$_2$CH$_2$S(CR$^1$R$^2$)$_i$X, or mixtures of (R$^9$O)$_3$SiCH$_2$CH$_2$S(CR$^1$R$^2$)$_i$X and (R$^9$O)$_3$SiCH$_2$CH$_2$S(CR$^1$R$^2$)$_i$SCH$_2$CH$_2$Si(OR$^9$)$_3$ and tetraalkyl orthosilicate and (R$^9$O)$_3$SiV.

Compounds of Formula 1 can also be prepared by treating a preformed material such as silica or aluminium oxide or carbon with (R$^9$O)$_3$SiCH$_2$CH$_2$S(CR$^1$R$^2$)$_i$X or a mixture of (R$^9$O)$_3$SiCH$_2$CH$_2$S(CR$^1$R$^2$)$_i$X and (R$^9$O)$_3$SiCH$_2$CH$_2$S(CR$^1$R$^2$)$_i$SCH$_2$CH$_2$Si(OR$^9$)$_3$, and with (R$^9$O)$_3$SiV if required, and with other end groups, cross linkers or polymers chains if required, in varying ratios in a solvent. At the end of the reaction the solid is filtered off and washed extensively with solvents such as water or alcohols to remove any remaining starting materials.

A further advantage of the processes is that based on a small number of intermediates a wide range of compounds of Formula 1 can be prepared. For example the esters (R$^9$O)$_3$SiCH$_2$CH$_2$S(CH$_2$)$_i$C(O)OMe are important intermediates leading via simple processes to a wide range of different structures for different applications. This common intermediate is prepared in a simple process involving a free radical reaction between vinyl trialkoxysilane and readily available thiol esters such as methyl thioglycolate or methyl 3-thiopropionate to give (CH$_3$O)$_3$SiCH$_2$CH$_2$S(CH$_2$)$_i$C(O)OMe. The next step involves either a sol gel process between these esters and tetraethyl orthosilicate or coating the surface of preformed materials such as silica to give compounds of Formula 1 where W is oxygen and R is methoxy. These ester compounds of Formula 1 can be readily transformed into a wide range of derivatives. Acid or base hydrolysis of these ester of Formula 1 affords the corresponding acid [O$_{3/2}$SiCH$_2$CH$_2$S(CH$_2$)$_i$C(O)OH]$_a$[O$_{4/2}$Si]$_c$ where the ratio of a to c depends on the relative concentrations of (CH$_3$O)$_3$SiCH$_2$CH$_2$S(CH$_2$)$_i$C(O)OMe and tetraethyl orthosilicate in the sol gel step or silica in the coating process. Metal salts of Formula 1, useful for heterogeneous metal mediated catalysis, can be readily prepared via standard synthetic methodologies from these carboxylic acids. Other derivatives such as amides, hydrazides and other esters can similarly be prepared by treatment of this ester of Formula 1 with the corresponding amines, hydrazines or alcohols in a solvent. At the end of the reaction the new derivative of Formula 1 can be easily purified through simple filtration from the reaction medium. As a consequence of the presence of the second functional group, sulfur, close to the carbonyl group these reactions proceed to completion with short reaction times usually one to two hours. Without this neighbouring group effect these reactions do not go to completion even after prolonged reaction times.

In this way the hydrazide of Formula 1 where W is oxygen and R is NHNH$_2$ as well as amides and polyamine derivatives of Formula 1 where W is oxygen and R is NH(CH$_2$)$_3$N(CH$_3$)$_2$ or R NH(CH$_2$)$_2$N(CH$_2$)$_2$NH$_2$ or NH(CH$_2$)$_2$(N(CH$_2$)$_2$NH)$_l$H where l is an integer between 2 and 40, or the esters of Formula 1 where W is oxygen and R is O(CH$_2$)$_2$OH or O(CH$_2$)$_2$O(CH$_2$CH$_2$O)$_j$H where j is an integer between 2 and 20,000 were prepared.

Compounds of Formula 1 where X is CHR$^3$Z or (CR$^3$Z)$_i$CHR$^3$Z where Z is OR$^6$, NR$^6$R$^7$ or SR$^6$ and R$^3$, R$^6$ and R$^7$ are each independently hydrogen, a linear or branched C$_{1-40}$-alkyl, C$_{2-40}$-alkenyl or C$_{2-40}$-alkynyl group, an aryl or C$_{1-40}$-alkylaryl group; and i is an integer from 1 to 6 are similarly prepared by a two step process. The first step is a free radical reaction between a thiol and trimethoxy vinyl silane followed either by a sol gel or coating process described above. For example a free radical reaction involving thioglycerol and trimethoxy vinyl silane gives (CH$_3$O)$_3$SiCH$_2$CH$_2$SCH$_2$CHOHCH$_2$OH which on sol gel with tetraethyl orthosilicate gave compounds of Formula 1 where i=1, R$^3$=H and Z=OH. Another example is the free radical reaction between 2-mercaptoethanol and trimethoxyvinyl silane to give (CH$_3$O)$_3$SiCH$_2$CH$_2$SCH$_2$CH$_2$OH which on sol gel with tetraethyl orthosilicate gave compounds of Formula 1 where i=1, R$^3$=H and Z=OH. Alternatively a preformed material such as silica or aluminium oxide can be treated with (CH$_3$O)$_3$SiCH$_2$CH$_2$SCH$_2$CHOHCH$_2$OH or (CH$_3$O)$_3$SiCH$_2$CH$_2$SCH$_2$CH$_2$OH in a solvent such as toluene, xylene or other aromatic or water. At the end of the reaction the solid is filtered off and washed extensively with solvents such as water or alcohols to remove any remaining starting materials.

Substituted ether derivatives of Formula 1 where h is zero, $R^3$=H and X is $OR^6$ can readily be prepared from the corresponding hydroxy compound of Formula 1 where X is OH, an alcohol and a homogeneous acid catalyst. For example treatment of the hydroxy compound of Formula 1 where e, i, h, b, d is zero, $R^3$=H; f is 2; X is OH with 1-butanol or octafluoro-pentan-1-ol in the presence of an acid catalyst gave the corresponding ether where $R^6$ is butyl or $C_5F_8H_3$ in quantitative yield.

Compounds of Formula 1 where B is present involve the use of the bisthiol $HS(CR^1R^2)_fSH$. The mixture of $(R^9O)_3SiCH_2CH_2S(CRR^1)_fSH$ and $(R^9O)_3SiCH_2CH_2S(CRR^1)_fSCH_2CH_2Si(OR^9)_3$ was synthesised via a free radical promoted addition of a thiol $HS(CR^1R^2)_fSH$ to vinyl trialkoxy silane. For example compounds $(CH_3O)_3SiCH_2CH_2S(CH_2)_3SCH_2CH_2Si(OCH_3)_3$ and $(CH_3O)_3SiCH_2CH_2S(CH_2)_3SH$ were synthesised via a free radical promoted addition of $HS(CH_2)_3SH$ to vinyl trimethoxy silane. The ratio of the products follows from the ratio of the reactants. $^1H$ and $^{13}C$ nmr spectroscopy was used to identify both compounds in the mixture. In the $^1H$ spectrum run in $CDCl_3$ signals at δ 0.92, 1.77 and 2.55 correspond to the $SiCH_2$, $CCH_2C$ and $CH_2SCH_2$ protons of $(CH_3O)_3SiCH_2CH_2S(CH_2)_3SH$ whilst signals at δ 0.93, 1.81 and 2.58 correspond to the $SiCH_2$, $CCH_2C$ and $CH_2SCH_2$ protons of $(CH_3O)_3SiCH_2CH_2S(CH_2)_3SCH_2CH_2Si(OCH_3)_3$. Sol gel or coating processes described above involving $(R^9O)_3SiCH_2CH_2S(CRR^1)_fSH$ and $(R^9O)_3SiCH_2CH_2S(CRR^1)_fSCH_2CH_2Si(OR^9)_3$ give the corresponding materials of Formula 1 where A, B and C are present, e is 0 and h is 1 and X is H.

Substituted phenyl sulfonic acid catalysts of Formula 1 can be prepared in a simple three-step process. The first step involves the formation of $(R^9O)_3SiCH_2CH_2SR$ via reaction of the corresponding thiol RSH with vinyl trialkoxy silane. Sol gel or coating processes using $(R^9O)_3SiCH_2CH_2SR$ then affords compounds of Formula 1 where e and h are zero. Treatment of these products where R is phenyl or benzyl with concentrated sulphuric acid gave the corresponding phenyl sulfonic acid.

Sulfonic acid compounds of Formula 1 where e is 2 and h is 1 and X is OH can be prepared via oxidation of compounds of Formula 1 where e is 0, h is 1 and X is H.

Templates to aid the preparation of pores with particular sizes and distributions in compounds of Formula 1 can be added at the sol gel stage. On preparation of the solid organopolysiloxane of Formula 1 these templates can be washed out using known methods.

Compounds of Formula 1 may be linked to a metal complex, for example as a ligand. A further aspect of the invention provides a Compound of Formula 1 further comprising a metal complex $M(L)_j$ where M is derived from a lanthanide, actinide, main group or transition metal with oxidation states ranging from zero to four and L is one or more optionally substituted ligands selected from halide, nitrate, acetate, carboxylate, cyanide, sulfate, carbonyl, imine, alkoxy, triaryl or trialkylphosphine and phenoxy and j is an integer from 0 to 8 and where the compound of Formula 1 is linked to the said metal complex.

Suitably, M is derived from cobalt, manganese, iron, nickel, palladium, platinum, rhodium, with oxidation states ranging from zero to four and L is one or more optionally substituted ligands selected from halide, nitrate, acetate, carboxylate, cyanide, sulfate, carbonyl, imine, alkoxy, triaryl or trialkylphosphine and phenoxy and j is an integer from 0 to 4.

Compounds of Formula 1 have a wide range of uses. The present invention provides a process for treating a feed material comprising contacting a compound of Formula 1 with a feed material:
i) to effect a chemical reaction by catalytic transformation of a component of the feed material to produce a desired product;
ii) to remove a component of the feed material so as to produce a material depleted in the removed component; or
iii) to remove an ionic species in the feed material in an ion exchange process.

The feed material may be a continuous stream for example a continuous process reaction feedstock, or may be in the form of a batch of material for discrete treatment. The feed material, for example a waste water or waste process stream, may be treated to selectively remove a components of the feed. The removed component may be an undesirable material in the feed and the process acts to provide a desired composition for the feed material that has been depleted in the selectively removed component after contact with compounds of Formula 1. This process may be used for example in removing unwanted species from a feed material in a pharmaceutical manufacturing or formulation process to improve the purity level of the pharmaceutical product as regards the removed material, for example metal species.

The process may be employed to remove desired species from a feed material for subsequent processing or analysis, for example a biological molecule such as an enzyme, peptide, protein and nucleic acid may be removed from a feed material to enable further processing or analysis of the removed components.

As a consequence of stricter environmental regulations there is a growing requirement for more effective systems for the removal and recovery of cations and anions from a wide spectrum of contaminated solvents, aqueous based wastes and from contaminated waters and contaminated products and pharmaceuticals. Compounds of Formula 1 are very effective at abstracting a wide range of cations and anions from various environments. For cations these include the lanthanides, actinides, main group and transition metals. Anions include arsenates, borates, chromates, permanganates and perchlorates.

Compounds of Formula 1 were designed to have very high affinity for ions and thus be able to remove them from various environments. Such high affinity is required when metal ions are tightly bound to particular functional groups for example in highly polar active pharmaceutical ingredients. The design of compounds of Formula 1 for these applications involves the presence of two or more different ligands to bind strongly to the ion. Depending on the ion to be removed the ligands are designed to be either soft or hard or a combination of both in order to optimise the affinity of the functionalised material for the ion. Furthermore the compounds of Formula 1 have been designed with easily modified functional groups in order to simply find the optimum combination of ligands for specific ion impurities.

For example the products from Examples 13, 17, 19, 22-26, 30-32, and 43 are very effective for the removal of cupric (II) ions from various solutions. Ferrous and ferric ions present in hydro-processing streams are readily removed using the products from Examples 13 and 43.

Compounds of Formula 1 can also remove precious metals such as palladium, platinum and rhodium ion as well as nickel (0) and nickel (II) from various different solutions and also bound to functional groups commonly found in active pharmaceutical ingredients such as amides, amines and carboxylic acids. For example treatment of a palladium acetate solution in tetrahydrofuran or dichloromethane with any of the products from Examples 13, 17, 19, 22-26, 30-32, and 41, 45, 47, 49 and 51-54 results in the complete removal of the palladium ions from solution. For solutions containing bis(triphenylphosphine) palladium chloride or acetate, the products from Examples 13, 17, 19, 22-26, 30-32, and 41, 45, 47, 49 and 51-54 are equally effective for its removal. The products from Examples 13, 17, 19, 22-26, 30-32, and 41, 45, 47, 49 and 51-54 are effective for the removal of chlorotris(triphenylphosphine) rhodium(I) from various solutions. The products from Examples 13, 17, 19, 22-26, 30-32, and 41, 45, 47, 49 and 51-54 are effective for the removal of platinum chloride from various solutions. Rhodium (III) is readily removed from various solutions using any of the products from Examples 13, 17, 19, 22-26, 30-32, and 41, 45, 47, 49 and 51-54.

Given their respective catalytic cycles the precious metals are often present in waste steams, solutions or bound to products in more than one oxidation state. Compounds of Formula 1, such as the amides formed in Examples 17, 25, 26 and 31-32 and the sulfides formed in Examples 41, 45, 47, 49 and 51-54 can scavenge these precious metals in their different oxidation states.

Compounds of Formula 1 can be used, as scavengers, to remove excess inorganic or organic reagents and side products from reactions mixtures or from impure chemical products. In these applications impurities are removed by matching functionality contained in these impurities with specific functionalised materials. For example the sulfonic acid or carboxylic acid materials prepared in Example 65 and 12 respectively can readily remove amines and hydrazines as well as other basic reagents including hydrides from reaction mixtures. The hydrazide and amine prepared in Examples 18 and 17 respectively can remove acids, isocyanates, acid chlorides, aldehydes, sulfonyl halides and chloroformates. The diol prepared in Example 8 can scavenge boronic acids as well as aldehydes and ketones. The following examples illustrate the scavenging of unwanted organic and inorganic compounds by compounds of Formula 1 but are not intended to limit the scope of their capability. Treatment of solutions containing amines such as benzylamine, hexylamine and 3-methoxypropylamine with 2 to 4 equivalents of an organopolysiloxane carboxylic acid of Formula 1 at room temperature for 1 hour led to the complete removal of the amine. Excess borohydrides such as sodium borohydride can be removed on treatment with the organopolysiloxane carboxylic acid of Formula 1. Toluene sulfonyl chloride, benzoyl chloride and phenyl isocyanate are readily removed using the amides from Examples 17, 25, 26 and 31 and 32.

Unlike the polystyrene based scavengers, organopolysiloxane compounds of Formula 1 can work in all solvents and are not limited in their application to reaction temperatures below 80° C. In addition compounds of Formula 1 do not suffer from swelling and possess the significant advantage of very fast kinetics compared to organic polymers.

Compounds of Formula 1 where i) b, e and h are zero and X is a substituted phenyl sulfonic acid and ii) h is 1 and X is OH are especially beneficial in catalysing a wide range of acid promoted reactions. For examples these compounds readily catalyse the condensation between aldehydes and aldehydes, aldehydes and ketones and ketones with ketones, reactions known as the Aldol condensation and the Claisen-Schmidt reaction. In addition these compounds catalyse esterification, trans-esterification, acylation, alkylation, cyclisation, etherification, dehydration and rearrangement reactions as well as a variety of protection and de-protection reactions. In addition these compounds of Formula 1 possess good thermal and chemical stability and reactions can be catalysed at much higher temperatures than functionalised polystyrene materials. One of the advantages of these catalysts is that on completion of the reaction they can be simply filtered off and reused. No apparent loss of activity was observed. Following filtration and washing with solvents such as acetone, alcohols, water and others well known to those skilled in the art of organic chemistry and drying at temperatures ranging from 20° C.-120° C. under reduced pressure the compounds of Formula 1 can be used to catalyse other reaction types without apparent loss of activity.

The following examples illustrate the catalytic activity of compounds of Formula 1 but are not intended to limit the scope of their capability to catalyse a wide range of reactions. Compounds of Formula 1, where i) b, e and h are zero and X is a substituted phenyl sulfonic acid and ii) h is 1 and X is OH, catalyse the esterification of carboxylic acids. For example treatment of oleic acid in refluxing ethanol with such compounds of Formula 1 gave the ester, ethyl oleate, in quantitative yield. These compounds also catalyse the trans-esterification of carboxylate esters. For example treatment of ethyl oleate in butanol at temperatures between 60-140° C. with these catalysts gives colourless butyl oleate. Utilising known reaction conditions compounds of Formula 1, particularly where i) b, e and h are zero and X is a substituted phenyl sulfonic acid and ii) h is 1 and X is OH, readily catalyse the ketalisation of ketones in very high yields and purity.

Metal salt/complexes of Formula 1 can catalyse a wide range of reactions well known to practitioners of organic and inorganic chemistry. Examples include but not limited to oxidations, reductions, alkylations, carbon-carbon bond formation, polymerisations, hydroformylations, arylations, acylations, isomerisations, alkylations, carboxylations, carbonylations, esterifications, trans-esterifications and rearrangements. These organopolysiloxane compounds of Formula 1 have many advantages for example they possess good thermal and chemical stability and broad solvent compatibility. One of the advantages of these catalysts is that on completion of the reaction they can be simply filtered off and reused. No apparent loss of activity was observed. Thus an important application of the metal derivatives of Formula 1 is their use as heterogeneous catalysts.

Compounds of Formula 1 where i) X is independently selected from $R^1$, C(=W)R or $(CR^3Z)_iCHR^3Z$ where W is selected from oxygen, sulfur, $NR^4$ or $NNR^4R^5$ and Z is selected from $OR^6$, $NR^6R^7$ or $SR^6$ and R is $R^6$, $OR^6$, $O(M^{+g})_{1/g}$, $NR^6R^7$, $NHNR^6R^7$ or $SR^6$ where $R^{1-7}$ are as designed above and M is a metal ion derived from a lanthanide, actinide, main group or transition metal, or ii) metal complexes $M(L)_j$ of i) are especially beneficial in catalysing a wide range of metal promoted reactions. For example palladium (II) complexes of compounds of Formula 1 where i) e and h are zero, X is C(=W)R where R is $O^-$ or $NR^6R^7$ and W is oxygen or sulfur, or ii) e and h are zero, X is H catalyse a wide range of carbon-carbon bond formation reactions such as Suzuki and Heck reactions. At the end of these reactions these catalysts can be filtered easily from the reaction mixture and reused.

Compounds of Formula 1 can also be used for solid phase synthesis through first attachment of the starting material to groups such as X or Z. A number of chemical reactions can then be conducted and in each step purification is facile through simple filtration. At the end of the sequence the desired material is released from the solid phase. For example 4-hydroxybenzaldehyde was attached to the diol prepared in Example 8. Alkylation of the free hydroxyl group using standard methodologies gave an aryl, alkyl ether. The product was then released from the material to give pure 4-alkoxybenzaldehyde.

In addition compounds of Formula 1 can be used as materials for solid phase extraction where a desired product is purified through selective retention on the functionalised materials whilst the impurities are removed. The desired material is then subsequently released using a different solvent system. For example amines can be retained on the acids prepared in Example 12 or 65 and the impurities are then washed out. Treatment of the material with a methanol solution containing ammonia releases the amine and after concentration the pure amine is obtained.

Compounds of Formula 1 can also be used for the separation or removal of gases, including the removal of malodorous volatile organic compounds. For example the removal of malodorous amines can be achieved with acids prepared in Examples 65 o12.

Further applications of compounds of Formula 1 include the use as materials for chromatographic separations. For example the materials of Formula 1 can be used in the separation of amines, including optically active amines. Primary amines can be selectively separated from secondary amines using compounds of Formula 1.

Compounds of Formula 1, containing optically active groups such as in the products formed in Examples 28 and 29, can be used as materials for chiral separation.

Compounds of Formula 1 can be used as materials for gel filtration and high speed size-exclusion chromatography as well as for high pressure liquid chromatography and solid phase extraction.

Compounds of Formula 1 can be used both to immobilise biological molecules such as enzymes, polypeptides, proteins and nucleic acids as well as for their separation and purification. In addition nucleic acids immobilised on compounds of Formula 1 can be used for conducting high volume nucleic acid hybridization assays.

Compounds of Formula 1 can be used as anti-microbial agents. The invention also provides an antimicrobial composition comprising a compound of Formula 1 and a carrier.

Compounds of Formula 1 can be applied as thin films onto a variety of surfaces.

The invention will now be described in detail with reference to illustrative examples of the invention.

EXAMPLE 1

A mixture containing trimethoxyvinylsilane (156 ml, 1.02 mol), methyl thioglycolate (87 ml, 0.97 mol) and di-tert butyl peroxide (10 drops) was stirred at room temperature and then warmed to 115° C. under an atmosphere of nitrogen. The mixture was maintained at this temperature for 1 h during which di-tert butyl peroxide (10 drops) was added every 20 min. The solution was then cooled to room temperature to give methyl (2-trimethoxysilylethyl) thioglycolate. $^1$H NMR CDCl$_3$, $\delta_H$ 3.66 (3H, s, COCH$_3$), 3.50 (9H, s, SiOCH$_3$), 3.18 (2H, s, CH$_2$C), 2.66 (2H, bm, CH$_2$S) and 0.96 (2H, bm, CH$_2$Si).

EXAMPLE 2

A mixture of the product from Example 1 (38.1 g, 0.15 mol) and tetraethyl orthosilicate (62.4 g, 0.3 mol) was dissolved in methanol (200 ml) and 1 M HCl (36 ml) was added with stirring. The mixture was then warmed at 80° C. until the methanol had evaporated and a glass had formed. The glass was crushed and then stirred in refluxing methanol. The material was then dried under reduced pressure of 0.1 mm Hg at 80° C. for 2 h to give a methyl ester of Formula 1, where $R^1$ and $R^2$ are hydrogen, X=CO$_2$Me and B, D, h, e=0 and f=1, as a white powder. $^1$H NMR D$_2$O/NaOD 3.18 (3H, s, OCH$_3$), 3.08 (2H, s, COCH$_2$S), 2.55 (2H, bm) and 0.6 (2h, bm).

EXAMPLE 3

A mixture of the product from Example 1 (25.4 g, 0.1 mol) and tetraethyl orthosilicate (223 ml, 1.0 mol) was dissolved in methanol (400 ml) and 1 M HCl (90 ml) was added with stirring. The mixture was then warmed at 80° C. until the methanol had evaporated and a glass had formed. The glass was crushed and then stirred in refluxing methanol. The material was then dried under reduced pressure of 0.1 mm Hg at 80° C. for 2 h to give a methyl ester as a white powder.

EXAMPLE 4

A mixture containing trimethoxyvinylsilane (14.8 g, 0.10 mol), ethyl thioglycolate (12.0 g, 0.1 mol) and di-tert butyl peroxide (10 drops) was stirred at room temperature and then warmed to 115° C. under an atmosphere of nitrogen. The mixture was maintained at this temperature for 6 h during which di-tert butyl peroxide (10 drops) was added every 20 min. The solution was then cooled to room temperature and added to a mixture of silica (80 g) in toluene (200 ml). This mixture was stirred under gentle reflux for 2 h. Triethylene tetra amine (19.6 g) dissolved in toluene (40 ml) was added and the mixture was stirred and refluxed for a further 2 h. The white solid was filtered, washed well with distilled water and then dried under reduced pressure of 0.1 mm Hg at 80° C. for 2 h to give the triethyleneamine ethyl amide (47.8 g) of Formula 1 where $R^1$ and $R^2$ are hydrogen, X=CONH(CH$_2$)$_2$NH(CH$_2$)$_2$NH$_2$ and B, D, h, e=0 and f=1, as a white powder.

EXAMPLE 5

A mixture containing trimethoxyvinylsilane (29.6 g, 0.20 mol), ethyl 3-mercaptopropionate (26.8 g, 0.20 mol) and di-tert butyl peroxide (10 drops) was stirred at room temperature and then warmed to 115° C. under an atmosphere of nitrogen. The mixture was maintained at this temperature for 6 h during which di-tert butyl peroxide (10 drops) was added every 20 min. The solution was then cooled to room temperature to give ethyl 3-(2-trimethoxysilylethylmercapto) propionate. $^1$H NMR CDCl$_3$, $\delta_H$ 3.60 (2H, bq), 3.46 (9H, bs), 2.7 (2H, m), 2.53 (4h, m), 1.1 (3H, bm) and 0.88 (2H, m).

EXAMPLE 6

A mixture of the product from Example 5 (28.2 g, 0.1 mol) and tetraethyl orthosilicate (223 ml, 1.0 mol) was dissolved in methanol (400 ml) and 1 M HCl (90 ml) was added with stirring. The mixture was then left at 80° C. until the methanol had evaporated and a glass had formed. The glass was crushed and then stirred in refluxing methanol. The material was then dried under reduced pressure of 0.1 mm Hg at 80° C. for 2 h to give an ethyl ester of Formula 1, where $R^1$ and $R^2$ are hydrogen, $X=CO_2Et$ and B, D, h, e=0 and f=2, as a white powder.

EXAMPLE 7

A mixture containing trimethoxyvinylsilane (15 ml, 0.10 mol), thioglycerol (10.8 g, 0.10 mol) and di-tert butyl peroxide (10 drops) was stirred at room temperature and then warmed to 115° C. under an atmosphere of nitrogen. The mixture was maintained at this temperature for 2 h during which di-tert butyl peroxide (10 drops) was added every 20 min. The solution was then cooled to room temperature. $^1H$ NMR $CDCl_3$, 3.53 (9H, s, $SiOCH_3$), 3.9-3.5 (3H, bm), 2.65-2.5 (4H, bm) and 0.97 (2H, bm, $CH_2Si$).

EXAMPLE 8

A mixture of the product from Example 7 (6 g, 0.023 mol) and tetraethyl orthosilicate (25.6 ml, 0.115 mol) was dissolved in methanol (80 ml) and 1 M HCl (12 ml) was added with stirring. The mixture was then warmed at 80° C. until the methanol had evaporated and a glass had formed. The glass was crushed and then stirred in refluxing methanol. The material was then dried under reduced pressure of 0.1 mm Hg at 80° C. for 2 h to give a diol of Formula 1 where $R^1$ and $R^2$ are hydrogen, $X=CHOHCH_2OH$ and B, D, h, e=0 and f=1, as a white powder.

EXAMPLE 9

A mixture of the product from Example 1 (25 g,) and silica (70 g, 28-200 mesh) in toluene (200 ml) was refluxed for 3 h. After cooling the mixture was filtered and washed with methanol and then dried to give a methyl ester of Formula 1, where $R^1$ and $R^2$ are hydrogen, $X=CO_2Me$, B, D, h, e=0 and f=1, as a white powder.

EXAMPLE 10

A mixture of the product from Example 1 (19.1 g) and tetraethyl orthosilicate (41.3 g) and dimethoxy dimethyl silane (4.4 g) was dissolved in methanol (160 ml) and 1 M HCl (22 ml) was added with stirring. The mixture was then left at 80° C. until the methanol had evaporated and a glass had formed. The glass was crushed and then stirred in refluxing methanol. The material was then dried under reduced pressure of 0.1 mm Hg at 80° C. for 2 h to give to give a methyl ester of Formula 1, where $R^1$ and $R^2$ are hydrogen, $X=CO_2Me$, B, D, h, e=0 and f=1, and with $(CH_3)_2SiO_{2/2}$ as a cross linker, as a white powder.

EXAMPLE 11

A mixture of the product from Example 1 (18.9 g) and tetraethyl orthosilicate (41.3 g) and trimethoxy methyl silane (3.1 g) was dissolved in methanol (160 ml) and 1 M HCl (21 ml) was added with stirring. The mixture was then left at 80° C. until the methanol had evaporated and a glass had formed. The glass was crushed and then stirred in refluxing methanol. The material was then dried under reduced pressure of 0.1 mm Hg at 90° C. for 2 h to give a methyl ester of Formula 1, where $R^1$ and $R^2$ are hydrogen, $X=CO_2Me$, B, h, e=0 and f=1, and V is methyl, as a white powder.

EXAMPLE 12

A mixture of the product from Example 3 (3.14 g) and potassium hydroxide (1.68 g) in water (30 ml) was gently refluxed for 2 h and then cooled to room temperature. The mixture was then acidified with hydrochloric acid and left to stand for 6 h. The white solid was filtered, washed well with distilled water and finally with methanol. The material was then dried under reduced pressure of 0.1 mm Hg at 80° C. for 2 h to give a carboxylic acid of Formula 1 where $R^1$ and $R^2$ are hydrogen, $X=CO_2H$ and B, D, h, e=0 and f=1, as a white powder (2.9 g). $^1H$ NMR $NaOD/D_2O$, $\delta_H$ 2.52 (2H, bm, $CH_2S$) and 0.58 (2H, bm, $CH_2Si$).

EXAMPLE 13

A mixture of the product from Example 12 (1.0 g) in water (30 ml) was treated with an aqueous solution of sodium hydroxide until the pH was 7. The white solid was filtered, washed well with distilled water and finally with methanol. The material was then dried under reduced pressure of 0.1 mm Hg at 80° C. for 2 h to give the sodium carboxylate salt of Example 12 as a white powder (0.9 g).

EXAMPLE 14

A mixture of the product from Example 13 (0.5 g) in water (30 ml) was treated with an aqueous solution of copper nitrate. The mixture was stirred for 1 h and then filtered. The blue solid was filtered, washed well with distilled water and finally with methanol. The material was dried under reduced pressure of 0.1 mm Hg at 80° C. for 2 h to give the copper salt as a blue powder (0.46 g).

EXAMPLE 15

A mixture of the product from Example 3 (1.03 g), ethylene glycol (1 ml) and methanesulfonic acid (6 drops) in toluene (5 ml) was stirred under gentle reflux for 12 h. The white solid was filtered and washed well with distilled water. The solid was then stirred in aqueous methanol (2:1, 20 ml) at 40° C. for 6 h and filtered and washed well with distilled water and methanol. The material was then dried under reduced pressure of 0.1 mm Hg at 80° C. for 2 h to give the 2-hydroxyethyl ester of Formula 1 where $R^1$ and $R^2$ are hydrogen, $X=CO_2CH_2CH_2OH$ and B, D, h, e=0 and f=1, as a white powder (1.1 g). $^1H$ NMR $NaOD/D_2O$, $\delta_H$ 3.55 (2H, bs, $CH_2O$) 3.47 (2H, bs, $CH_2O$), 2.52 (2H, bm, $CH_2S$) and 0.58 (2H, bm, $CH_2Si$).

EXAMPLE 16

A mixture of the product from Example 3 (1.03 g) and 3-methoxypropylamine (1 ml) in toluene (5 ml) was stirred under gentle reflux for 2 h. The white solid was filtered and washed well with distilled water. The solid was then stirred in aqueous methanol (2:1, 20 ml) at 40° C. for 6 h and filtered and washed well with distilled water and methanol. The material was then dried under reduced pressure of 0.1 mm Hg at 80° C. for 2 h to give the 3-methoxypropylamide (1.17 g) of Formula 1 where $R^1$ and $R^2$ are hydrogen, $X=CONH(CH_2)_3OMe$ and B, D, h, e=0 and f=1. $^1H$ NMR $NaOD/D_2O$, $\delta_H$ 3.42 (2H, bm), 3.25 (3H, bs, $OCH_3$), 3.19 (2H, bm), 2.61 (2H, bm, $CH_2S$), 1.73 (2H, bm, $CCH_2C$) and 0.66 (2H, bm, $CH_2Si$).

EXAMPLE 17

A mixture of the product from Example 3 (1.05 g), diethylenetriamine (1.2 ml) in toluene (5 ml) was stirred under gentle reflux for 20 h. The white solid was filtered and washed well with distilled water. The solid was then stirred in aqueous methanol (2:1, 20 ml) at 40° C. for 6 h and filtered and washed well with distilled water and methanol. The material was then dried at 0.1 mm Hg at 80° C. for 2 h to give the amide (1.11 g) of Formula 1 where $R^1$ and $R^2$ are hydrogen, X=$CONH(CH_2)_2NH(CH_2)_2NH_2$ and B, D, h, e=0 and f=1, as a white powder. $^1H$ NMR $NaOD/D_2O$, $\delta_H$ 3.23 (2H, bm, $CONHCH_2$), 2.80-2.52 (8H, bm) and 0.67 (2H, bm, $CH_2Si$).

EXAMPLE 18

A mixture of the product from Example 3 (3.05 g), hydrazine hydrate (3 ml) in toluene (20 ml) was stirred at 40° C. for 20 h. The white solid was filtered and washed well with distilled water. The solid was then stirred in aqueous methanol (2:1, 20 ml) at 40° C. for 6 h and filtered and washed well with distilled water and methanol. The material was then dried under reduced pressure of 0.1 mm Hg at 80° C. for 2 h to give the hydrazide (3.11 g) of Formula 1 where $R^1$ and $R^2$ are hydrogen, X=$CONHNH_2$ and B, D, h, e=0 and f=1, as a white powder. $^1H$ NMR $NaOD/D_2O$, $\delta_H$ 2.61 (2H, bm, $CH_2S$) and 0.66 (2H, bm, $CH_2Si$).

EXAMPLE 19

A mixture of the product from Example 3 (1.05 g), 3-dimethylaminopropylamine (1.2 ml) in toluene (5 ml) was stirred under gentle reflux for 12 h. The white solid was filtered and washed well with distilled water. The solid was then stirred in aqueous methanol (2:1, 20 ml) at 40° C. for 6 h and filtered and washed well with distilled water and methanol. The material was then dried under reduced pressure of 0.1 mm Hg at 80° C. for 2 h to give the 3-dimethylaminopropyl amide (1.16 g) of Formula 1 where $R^1$ and $R^2$ are hydrogen, X=$CONH(CH_2)_3N(CH_3)_2$ and B, D, h, e=0 and f=1, as a white powder. $^1H$ NMR $NaOD/D_2O$, $\delta_H$ 3.16 (2H, m), 2.63 (2H, bm), 2.28 (2H, bm), 2.09 (6H, s), 1.61 (2H, bm, $CCH_2C$) and 0.71 (2H, bm, $CH_2Si$).

EXAMPLE 20

A mixture containing trimethoxyvinylsilane (32.13 ml, 0.21 mol), 2-mercapto ethanol (14 ml, 0.2 mol) and di-tert butyl peroxide (10 drops) was warmed to 115° C. under an atmosphere of nitrogen and maintained at this temperature for 1 h. The solution was then cooled to room temperature to give 2-hydroxyethyl, 2-trimethoxysilylethyl sulfide. $^1H$ NMR, $CDCl_3$ 3.49 (2H, t, $OCH_2$) and 2.63 (4H, bm, $OCCH_2SCH_2$).

EXAMPLE 21

A mixture of 2-hydroxyethyl, 2-trimethoxysilylethyl sulfide (14.69 g, 0.065 mol), silica (Merck 7734, 39.81 g) and toluene (160 ml) were stirred under gentle reflux for 2 h. The mixture was cooled and then filtered and the white solid was washed well with water and then methanol to give 2-hydroxyethyl sulfide ethyl silica (45 g) of Formula 1 where $R^1$ and $R^2$ are hydrogen, X=OH and B, D, h, e=0 and f=2, as a white powder. $^1H$ NMR, $NaOD/D_2O$, $\delta_H$ 3.5 (2H, bm, $CH_2O$) 2.74-2.52 (4H, bm, $CH_2SCH_2$) and 0.58 (2H, bm, $CH_2Si$).

EXAMPLE 22

A mixture of the ester formed in Example 3 (15 g) and N-(2-hydroxyethyl)-ethylenediamine (4.7 g) in toluene (45 ml) was stirred under gentle reflux for 2 h. The white solid was filtered and washed well with distilled water. The material was then dried under reduced pressure of 0.1 mm Hg at 80° C. for 2 h to give the N-(2-hydroxyethyl)-aminoethyl amide (17.8 g) of Formula 1 where $R^1$ and $R^2$ are hydrogen, X=$CONH(CH_2)NH(CH_2)OH$ and B, D, h, e=0 and f=1, as a white powder.

EXAMPLE 23

A mixture of the ester formed in Example 9 (30 g) and 1-(3-aminopropyl) imidazole (7.4 g) in toluene (200 ml) was stirred under gentle reflux for 2 h. The white solid was filtered and washed well with distilled water. The material was then dried under reduced pressure of 0.1 mm Hg at 80° C. for 2 h to give the 3-imidazole 1-propyl amide (35 g) of Formula 1 where X=C(O)R and R=3-(1-imidazoyl) propylamine, $R^1$ and $R^2$=H, f=1 and B, D, h, e=0.

EXAMPLE 24

A mixture of the ester formed in Example 9 (7 g) and 1-methyl piperazine (2.1 g) in toluene (30 ml) was stirred under gentle reflux for 2 h. The white solid was filtered and washed well with distilled water. The material was then dried under reduced pressure of 0.1 mm Hg at 80° C. for 2 h to give the 4-methyl piperazine amide (8.3 g) of Formula 1 where X=C(O)R and R=4-methyl piperazyl, $R^1$ and $R^2$=H, f=1 and B, D, h, e=0.

EXAMPLE 25

A mixture of methyl 2-trimethoxysilylethyl thioacetate (from Example 1, 17.02 g) and silica (40 g) in toluene (150 ml) was stirred under gentle reflux for 2 h. Triethylene tetra amine (19.6 g) dissolved in toluene (40 ml) was added and the mixture was stirred and refluxed for a further 2 h. The white solid was filtered, washed well with distilled water and then dried to give the triethyleneamine ethyl amide (47.8 g) of Formula 1 where $R^1$ and $R^2$ are hydrogen, X=CONH$(CH_2)_2NH(CH_2)_2NH(CH_2)_2NH_2$ and B, D, h, e=0 and f=1, as a white powder.

EXAMPLE 26

A mixture of methyl 2-trimethoxysilylethyl thioacetate (from Example 1, 17.2 g) and silica (41 g) in toluene (200 ml) was stirred under gentle reflux for 2 h. Tetraethylene penta amine (19.6 g) was added and the mixture stirred and refluxed for a further 2 h. The white solid was filtered, washed well with distilled water and then dried to give the tetraethyleneamine ethyl amide (48.8 g) of Formula 1.

EXAMPLE 27

A mixture of the ester formed in Example 9 (10 g) and 1-(2-aminoethyl) piperazine (3.3 g) in toluene (45 ml) was stirred under gentle reflux for 2 h. The white solid was filtered and washed well with distilled water. The material was then dried to give an amide (11 g) of Formula 1 where X=C(O)R and R=2-(piperazine) ethylamine, $R^1$ and $R^2$=H, f=1 and B, D, h and e=0.

EXAMPLE 28

A mixture of the ester formed in Example 3 (4.2 g) and (+) α methylbenzylamine (0.7 g) in acetonitrile (10 ml) was stirred under gentle reflux for 8 h. The white solid was filtered and washed well with methanol. The material was then dried to give a chiral amide (4.6 g) of Formula 1 where X=C(O)R and R=(+) α methylbenzylamine, $R^1$ and $R^2$=H, f=1 and B, D, h and e=0.

EXAMPLE 29

A mixture of the ester formed in Example 3 (4.0 g) and (−) 2-amino-1-propanol (0.6 g) in acetonitrile (10 ml) was stirred under gentle reflux for 8 h. The white solid was filtered and washed well with methanol. The material was then dried to give a chiral amide (4.4 g) of Formula 1 where X=C(O)R and R=(−)2-amino-1-propanol, $R^1$ and $R^2$=H, f=1 and B, D, h and e=0.

EXAMPLE 30

A mixture of methyl 2-trimethoxysilylethyl thioacetate (from Example 1, 17.2 g) and silica (42 g) in toluene (200 ml) was stirred under gentle reflux for 2 h. 3-Aminomethylpyridine (14.6 g) was added and the mixture stirred and refluxed for a further 2 h. The white solid was filtered, washed well with distilled water and then dried to give the pyridyl methyl amide (48.6 g) of Formula 1 where X=C(O)R and R=3-aminomethylpyridine, $R^1$ and $R^2$=H, f=1 and B, D, h and e=0.

EXAMPLE 31

A mixture of methyl 2-trimethoxysilylethyl thioacetate (from Example 1, 13.7 g), alumina (40.6 g) and toluene (150 ml) were stirred under gentle reflux for 5 h. The mixture was cooled and then filtered and the white solid was washed well with water and then methanol to give to give a methyl ester of Formula 1, where $R^1$ and $R^2$ are hydrogen, X=$CO_2Me$ and B, C, D, h and e=0 and f=1, as a white powder (46 g).

EXAMPLE 32

A mixture of the ester formed in Example 31 (6.1 g) and triethylene tetra amine (2.2 g) in toluene (20 ml) was stirred under gentle reflux for 4 h. The white solid was filtered and washed well with distilled water. The material was then dried to give to give the corresponding tetraethyleneamine ethyl amide (6.6 g) of Formula 1.

EXAMPLE 33

A mixture of the product from Example 12 and thionyl chloride (5 ml) was stirred under gentle reflux for 2 h and then the excess thionyl chloride was evaporated to give the corresponding acid chloride of Formula 1, where $R^1$ and $R^2$ are hydrogen, X=COCl and B, D, h and e=0 and f=1.

EXAMPLE 34

A solution of palladium acetate (0.24 g, 1.188 mmol) in THF (50 ml) was added to the sodium salt of the carboxylic acid (Example 13, 2.0 g, 1.24 mmol) and the mixture was stirred overnight. The yellow solid was filtered and washed well with THF and then dried. Weight—2.04 g, Surface area 340 $m^2/g$

EXAMPLE 35

A mixture of 2-hydroxyethyl sulfide ethyl silica (1 g) and para toluenesulfonic acid (0.05 g) in butanol (5 ml) was stirred under gentle reflux for 4 h and then filtered. The white solid was filtered and washed well with distilled water. The material was then dried to give 2-butoxyethyl sulfide ethyl silica (1.2 g) of Formula 1 where $R^1$ and $R^2$ are hydrogen, X=Obutyl and B, D, h and e=0 and f=2.

EXAMPLE 36

A mixture of 2-hydroxyethyl sulfide ethyl silica (1 g) and para toluenesulfonic acid (0.05 g) in octafluoropentanol (5 ml) was stirred under gentle reflux for 4 h and then filtered. The white solid was filtered and washed well with distilled water. The material was then dried to give (2-octafluoropentyl)ethyl sulfide ethyl silica (1.2 g) of Formula 1 where $R^1$ and $R^2$ are hydrogen, X=$OC_5F_8H_3$ and B, D, h and e=0 and f=2.

EXAMPLE 37

A mixture of 2-hydroxyethyl sulfide ethyl silica (1.1 g), 1-methylpiperazine (0.8 g) and para toluenesulfonic acid (0.5 g) in toluene (10 ml) was stirred under gentle reflux for 10 h and then filtered. The white solid was filtered and washed well with distilled water. The material was then dried to give 2-piperazine ethyl sulfide ethyl silica (1.2 g) of Formula 1.

EXAMPLE 38

To sodium silicate (197.1 g, 0.929 mol) dissolved in water (500 ml) was added the methyl ester from Example 2 (36.15 g, 0.115 mol). The mixture was stirred until a solution was obtained. After acidification with conc. hydrochloric acid the solution was placed in a large Pyrex dish and warmed at 80° C. until a glass was obtained. The glass was crushed to give the carboxylic acid as a white solid (85 g, 92% yield) where $R^1$ and $R^2$ are hydrogen, X=$CO_2H$ and B, D, h and e=0 and f=2.

EXAMPLE 39

A mixture containing trimethoxyvinylsilane (12.28 ml, 0.081 mol), 1,3 dimercapto propane (6.23 g, 0.057 mol) and di-tert butyl peroxide (10 drops) was stirred at room temperature for 1 h then warmed to 100° C. under an atmosphere of nitrogen for 2 h. The solution was cooled to room temperature to give a mixture (3:2 ratio) of 3-mercaptopropyl, 2-trimethoxysilylethyl sulfide 270 MHz, $\delta_H$ ($CDCl_3$) 3.53 (9H, s), 2.55 (4H, m), 1.77 (2H, m) and 0.92 (2H, m) and 1,3 di (2-trimethoxysilylethylsulfyl) propane, 270 MHz, $\delta_H$ ($CDCl_3$) 3.53 (18H, s), 2.58 (8H, m), 1.81 (2H, m) and 0.93 (4H, m).

EXAMPLE 40

A mixture of the product from Example 39 (7.05 g, 0.0296 mol) and tetraethyl orthosilicate (13 ml, 0.059 mol) was dissolved in methanol (50 ml) and 1 M HCl (7 ml) was added with stirring. The mixture was then warmed at 80° C. until the methanol had evaporated and a glass had formed. The glass was crushed and then stirred in refluxing methanol. The material was then dried under reduced pressure of 0.1 mm Hg at 80° C. for 2 h to give a compound of Formula 1 where $R^1$ and $R^2$ are hydrogen, X is hydrogen, D and e are 0, h is 1, f is 3, and a is 3, b is 2 and c is 10 as a white powder, 270 MHz, $\delta_H$ ($D_2O$/NaOD) 2.45 (4H, m), 2.27 (2H, m), 1.55 (2H, m) and 0.52 (2H, m); 67.8 MHz $\delta_C$ ($D_2O$/NaOD) 36.25, 30.69, 27.83, 24.99 and 16.46 for the fragment O$_{3/2}$SiCH$_2$CH$_2$S(CH$_2$)$_3$SH; 270 MHz, δ$_H$ (D$_2$O/NaOD) 2.52 (8H, m), 1.73 (2H, q, J 6.6 Hz) and 0.58 (4H, m); 67.8 MHz δ$_C$ (D$_2$O/NaOD) 29.89, 28.78, 28.18 and 16.67 for the fragment O$_{3/2}$SiCH$_2$CH$_2$S(CH$_2$)$_3$SCH$_2$CH$_2$SiO$_{3/2}$.

EXAMPLE 41

A mixture of the product from Example 39 (2.54 g, 0.0083 mol) and tetraethyl orthosilicate (18.6 ml, 0.083 mol) was dissolved in methanol (100 ml) and 1 M HCl (8.9 ml) was added with stirring. The mixture was then warmed at 80° C. until the methanol had evaporated and a glass had formed. The glass was crushed and then stirred in refluxing methanol. The material was then dried under reduced pressure of 0.1 mm Hg at 80° C. for 2 h to give a compound of Formula 1 where R$^1$ and R$^2$ are hydrogen, X is hydrogen, D and e are 0, h is 1, f is 3, and a is 3, b is 2 and c is 50 as a white powder.

EXAMPLE 42

A mixture containing trimethoxyvinylsilane (13 ml, 0.0851 mol), 1,3 dimercapto propane (7.66 g, 0.071 mol) and di-tert butyl peroxide (10 drops) was stirred at room temperature for 1 h then warmed to 100° C. under an atmosphere of nitrogen. The mixture was maintained at this temperature for 1 h. The solution was then cooled to room temperature to give a mixture (4:1 ratio) of (CH$_3$O)$_3$SiCH$_2$CH$_2$S(CH$_2$)$_3$SH and (CH$_3$O)$_3$SiCH$_2$CH$_2$S(CH$_2$)$_3$SCH$_2$CH$_2$Si(OCH$_3$)$_3$.

EXAMPLE 43

A mixture of the product from Example 42 (3.12 g, 0.01155 mol) and tetraethyl orthosilicate (25.7 ml, 0.1155 mol) was dissolved in methanol (150 ml) and 1 M HCl (12 ml) was added with stirring. The mixture was then warmed at 80° C. until the methanol had evaporated and a glass had formed. The glass was crushed and then stirred in refluxing methanol. The material was then dried under reduced pressure of 0.1 mm Hg at 80° C. for 2 h to give a compound of Formula 1 where R$^1$ and R$^2$ are hydrogen, X is hydrogen, D and e are 0, h is 1, f is 3, and a is 4, b is 1 and c is 50 as a white powder.

EXAMPLE 44

A mixture containing trimethoxyvinylsilane (10.4 ml, 0.0688 mol), 1,3 dimercapto propane (4.66 g, 0.043 mol) and di-tert butyl peroxide (10 drops) was stirred at room temperature for 1 h then warmed to 100° C. under an atmosphere of nitrogen. The mixture was maintained at this temperature for 1 h. The solution was then cooled to room temperature to give a mixture (2:3 ratio) of (CH$_3$O)$_3$SiCH$_2$CH$_2$S(CH$_2$)$_3$SH and (CH$_3$O)$_3$SiCH$_2$CH$_2$S(CH$_2$)$_3$SCH$_2$CH$_2$Si(OCH$_3$)$_3$.

EXAMPLE 45

A mixture of the product from Example 44 (2.33 g, 0.0068 mol) and tetraethyl orthosilicate (15 ml, 0.068 mol) was dissolved in methanol (100 ml) and 1 M HCl (8 ml) was added with stirring. The mixture was then warmed at 80° C. until the methanol had evaporated and a glass had formed. The glass was crushed and then stirred in refluxing methanol. The material was then dried under reduced pressure of 0.1 mm Hg at 80° C. for 2 h to give a compound of Formula 1 where R$^1$ and R$^2$ are hydrogen, X is hydrogen, D and e are 0, h is 1, f is 3, and a is 2, b is 3 and c is 50 as a white powder.

EXAMPLE 46

A mixture containing trimethoxyvinylsilane (9.13 ml, 0.06 mol), 1,3 dimercapto propane (3.24 g, 0.03 mol) and di-tert butyl peroxide (10 drops) was stirred at room temperature for 1 h then warmed to 100° C. under an atmosphere of nitrogen. The mixture was maintained at this temperature for 1 h and then cooled to room temperature to give (CH$_3$O)$_3$SiCH$_2$CH$_2$S(CH$_2$)$_3$SCH$_2$CH$_2$Si(OCH$_3$)$_3$ and a trace of (CH$_3$O)$_3$SiCH$_2$CH$_2$S(CH$_2$)$_3$SH. 270 MHz, δ$_H$ (CDCl$_3$) 3.53 (18H, s), 2.58 (8H, m), 1.81 (2H, m) and 0.93 (4H, m); MHz δ$_C$ (CDCl$_3$) 50.60, 30.77, 29.14, 26.07 and 10.57.

EXAMPLE 47

The product from Example 46 (4.02 g, 0.01 mol) was dissolved in methanol (50 ml) and 1 M HCl (2 ml) was added with stirring. The mixture was then warmed at 80° C. until the methanol had evaporated and a glass had formed. The glass was crushed and then stirred in refluxing methanol. The material was then dried under reduced pressure to give a white powder.

EXAMPLE 48

A mixture containing trimethoxyvinylsilane (50.8 ml, 0.333 mol), 1,2 dimercapto ethane (20 ml, 0.238 mol) and di-tert butyl peroxide (10 drops) was stirred at room temperature for 1 h then warmed to 100° C. under an atmosphere of nitrogen for 1 h. The solution was then cooled to room temperature to give a mixture (3:2 ratio) of 2-mercaptoethyl, 2-trimethoxysilylethyl sulfide 270 MHz, δ$_H$ (CDCl$_3$) 3.53 (9H, s), 2.58 (4H, m) and 0.88 (2H, m); MHz δ$_C$ (CDCl$_3$) 50.53, 35.96, 31.82, 29.14, 25.98 and 10.57. and 1,2 di (2-trimethoxysilylethylsulfyl) ethane, 270 MHz, δ$_H$(CDCl$_3$) 3.48 (18H, s), 2.66 (4H, bs), 2.56 (4H, bm) and 0.92 (4H, m); MHz δ$_C$ (CDCl$_3$) 50.53, 31.85, 26.15 and 10.61.

EXAMPLE 49

A mixture of the product from Example 48 (8.32 g, 0.0276 mol) and tetraethyl orthosilicate (61.5 ml, 0.276 mol) was dissolved in methanol (200 ml) and ammonia (0.88, 51 ml) was added with stirring. The mixture was then warmed at 80° C. until the methanol had evaporated and a glass had formed. The glass was crushed and then stirred in refluxing methanol. The material was then dried under reduced pressure to give a compound of Formula 1 where R$^1$ and R$^2$ are hydrogen, X is hydrogen, D and e are 0, h is 1, f is 2, and a is 3, b is 2 and c is 50 as a white powder.

EXAMPLE 50

A mixture containing trimethoxyvinylsilane (29 ml, 0.190 mol), 1,2 dimercapto ethane (10 ml, 0.119 mol) and di-tert butyl peroxide (10 drops) was stirred at room temperature for 1 h then warmed to 100° C. under an atmosphere of nitrogen. The mixture was maintained at this temperature for 1 h. The solution was then cooled to room temperature to give a mixture (2:3 ratio) of (CH$_3$O)$_3$SiCH$_2$CH$_2$S(CH$_2$)$_2$SH and (CH$_3$O)$_3$SiCH$_2$CH$_2$S(CH$_2$)$_2$SCH$_2$CH$_2$Si(OCH$_3$)$_3$.

EXAMPLE 51

A mixture of the product from Example 50 (8.66 g, 0.0262 mol) and tetraethyl orthosilicate (54.42 ml, 0.262 mol) was dissolved in methanol (200 ml) and 1 M HCl (51 ml) was added with stirring. The mixture was then warmed at 80° C. until the methanol had evaporated and a glass had formed. The glass was crushed and then stirred in refluxing methanol. The material was then dried under reduced pressure to give a compound of Formula 1 where $R^1$ and $R^2$ are hydrogen, X is hydrogen, D and e are 0, h is 1, f is 2, and a is 2, b is 3 and c is 50 as a white powder.

EXAMPLE 52

A mixture of the product from Example 39 (5 g,) and silica (20 g, 28-200 mesh) in toluene (70 ml) was stirred and refluxed for 12 h. After cooling the mixture was filtered, washed with methanol and then dried.

EXAMPLE 53

A mixture of the product from Example 44 (6 g) and silica (20 g) in toluene (70 ml) was stirred and refluxed for 12 h. After cooling the mixture was filtered, washed with methanol and then dried.

EXAMPLE 54

A mixture of the product from Example 48 (5 g) and silica (20 g, 400-200 mesh) in toluene (70 ml) was stirred and refluxed for 12 h. After cooling the mixture was filtered, washed with methanol and then dried.

EXAMPLE 55

A mixture of the product from Example 43 (2 g) and hydrogen peroxide (30%, 25 ml) in water (10 ml) was stirred at room temperature for 12 h. The mixture was filtered and washed with methanol and then dried to give a compound of Formula 1 where $R^1$ and $R^2$ are hydrogen, D is 0, h is 1, X is OH, the integers e and f are respectively 2 and 3, and a is 4, b is 1 and c is 50 as a white powder.

EXAMPLE 56

A mixture of the product from Example 39 (0.05 mol) and tetraethyl orthosilicate (41.6 g, 0.2 mol) and dimethoxy dimethyl silane (2.4 g, 0.02 m) was dissolved in methanol (160 ml) and 1 M HCl (22 ml) was added with stirring. The mixture was then left at 80° C. until the methanol had evaporated and a glass had formed. The glass was crushed and then stirred in refluxing methanol. The material was then dried under reduced pressure to give a compound of Formula 1 where $R^1$ and $R^2$ are hydrogen, X is hydrogen, D is 0, h is 1, the integers e and f are respectively 0 and 3, and a is 3, b is 2 and c is 20 with the dimethyl silyl cross linker as a white powder.

EXAMPLE 57

A mixture of the product from Example 39 (0.05 mol) and tetraethyl orthosilicate (41.6 g, 0.2 mol) and trimethoxy methyl silane (2.72 g, 0.02 mol) was dissolved in methanol (160 ml) and 1 M HCl (21 ml) was added with stirring. The mixture was then left at 80° C. until the methanol had evaporated and a glass had formed. The glass was crushed and then stirred in refluxing methanol. The material was then dried under reduced pressure to give a compound of Formula 1 where $R^1$ and $R^2$ are hydrogen, X is hydrogen, V is methyl, h is 1, the integers e and f are respectively 0 and 3, and a is 3, b is 2, c is 20 and d is 1 as a white powder.

EXAMPLE 58

To ethylene glycol bis thioglycolate (7.34 g, 0.0349 mol) was added vinyltrimethoxysilane (11.42 g, 11.8 ml, 0.077 mol). The solution was left to stir at room temperature for 1 hour and then 12 drops of di-tert-butyl peroxide was added and the solution was heated at 100° C. with stirring for one hour.

EXAMPLE 59

A solution containing the product from Example 58 (2.39 g, 4.72 mmol), tetraethyl orthosilicate (5.88 g, 6.3 ml, 28.2 mmol), methanol (25 ml) and 1M HCl (4 ml) was left overnight at 90° C. The glass was crushed and then stirred in refluxing methanol. The material was then dried to give a compound of Formula 1 where $R^1$ and $R^2$ are hydrogen, X is —[$CO_2(CH_2)_nCO_2$]— linking two moieties $A^1$, $A^1$ being moiety A without X and n is 2, B, D, h and e is 0, as a white powder.

EXAMPLE 60

A mixture containing the product from Example 58 (4.30 g), silica (18.04 g) and toluene (100 ml) was refluxed for 5 hours with stirring. It was allowed to cool, filtered then washed with methanol.

EXAMPLE 61

A mixture containing trimethoxyvinylsilane (15.6 ml, 0.102 mol), thioacetic acid (0.097 mol) and di-tert butyl peroxide (10 drops) was stirred at room temperature and then warmed to 115° C. for 1 h during which di-tert butyl peroxide (10 drops) was added every 20 min. The solution was then cooled to room temperature to give $(CH_3O)_3SiCH_2CH_2SC(O)CH_3$.

EXAMPLE 62

A mixture containing the product from Example 61 (4.10 g), silica (20 g) and toluene (100 ml) was refluxed for 5 hours with stirring. It was allowed to cool, filtered then washed with methanol to give a compound of Formula 1 where B, D, e, f and h are 0 and X is $C(O)CH_3$.

EXAMPLE 63

A mixture containing trimethoxyvinylsilane (15.6 ml, 0.102 mol), thiophenol (0.097 mol) and di-tert butyl peroxide (10 drops) was stirred at room temperature and then warmed to 115° C. The mixture was maintained at this temperature for 6 h during which di-tert butyl peroxide (10 drops) was added every 20 min. The solution was cooled to room temperature to give $(CH_3O)_3SiCH_2CH_2Sphenyl$.

EXAMPLE 64

A mixture containing trimethoxyvinylsilane (15.6 ml, 0.102 mol), benzylmercaptan (0.097 mol) and di-tert butyl peroxide (10 drops) was stirred at room temperature and then warmed to 115° C. The mixture was maintained at this temperature for 1 h. The solution was cooled to give (CH$_3$O)$_3$SiCH$_2$CH$_2$SCH$_2$phenyl.

EXAMPLE 65

A mixture of the product from Example 63 (16 g) and silica (70 g, 28-200 mesh) in toluene (200 ml) was refluxed for 3 h. After cooling the mixture was filtered and washed with methanol and then dried to give a compound of Formula 1, where X=phenyl, B, D, h, f and e=0 as a white powder.

EXAMPLE 66

A mixture of the product from Example 65 (5 g) and concentrated sulphuric acid (40 ml) was stirred at 50° C. for 4 hours. After cooling the solid was filtered and washed well with water to give a compound of Formula 1 where X=C$_6$H$_4$SO$_3$H, B, D, h, f and e=0 as a white powder.

EXAMPLE 67

A mixture of the product from Example 64 (18 g) and silica (70 g, 28-200 mesh) in toluene (200 ml) was refluxed for 3 h. After cooling the mixture was filtered and washed with methanol and then dried to give a compound of Formula 1, where X=CH$_2$phenyl, B, D, h, f and e=0 as a white powder.

EXAMPLE 68

A mixture of the product from Example 67 (5 g) and concentrated sulphuric acid (40 ml) was stirred at 50° C. for 4 hours. After cooling the solid was filtered and washed well with water to give a compound of Formula 1 where X=CH$_2$C$_6$H$_4$SO$_3$H, B, D, h, f and e=0 as a white powder.

EXAMPLE 69

A mixture of the product from Example 3 (2 g) and hydrogen peroxide (30%, 25 ml) in water (10 ml) was stirred at room temperature for 12 h. The mixture was filtered and washed with methanol and then dried to give a methyl ester of Formula 1, where R$^1$ and R$^2$ are hydrogen, X=CO$_2$Me and e=2 and f=1, as a white powder. $^1$H NMR, D$_2$O/NaOD $\delta_H$ 3.16 (3H, s OCH$_3$), 2.82 (2H, bm, CH$_2$SO$_2$) and 0.65 (2H, bm, CH$_2$Si)

EXAMPLE 70

The product from Example 40 (0.06 g) was added to a sample (1 ml) of a 1000 ppm orange coloured solution of palladium acetate in THF. The solution went completely colourless in less than 5 minutes. The mixture was then filtered. Analysis of the filtrate showed that the palladium had been removed. Examples 3, 4, 8, 13, 17, 19, 21, 22, 23, 26-27, 32, 41, 43, 45, 47, 49, 51-54, 59 and 60 (0.06 g) were equally effective in the above test.

EXAMPLE 71

The product from Example 40 (0.08 g) was added to a sample (1 ml) of a 250 ppm yellow coloured solution of bis(triphenylphosphine) palladium chloride in THF. The solution went completely colourless in less than 10 minutes. The mixture was stirred for a further 30 minutes at room temperature and then filtered. Analysis of the filtrate showed that the palladium had been removed. Examples 17, 19, 22, 26, 27, 41, 43, 45, 47, 49 and 51-54 were equally effective in the above test.

EXAMPLE 72

The product from Example 40 (0.09 g) was added to a sample (1 ml) of a 250 ppm yellow coloured solution chlorotris(triphenylphosphine)rhodium(I) in THF. The solution went completely colourless in less than 10 minutes. The mixture was stirred for a further 30 minutes at room temperature and then filtered. Analysis of the filtrate showed that the rhodium catalyst had been removed. Examples 17, 19, 22, 26, 27, 41, 43, 45, 47, 49 and 51-54 were equally effective in the above test.

EXAMPLE 73

The product from Example 40 (0.09 g) was added to a sample (1 ml) of a yellow solution of potassium platinum chloride (0.02 g) in water (25 ml). The mixture was stirred for 30 minutes at room temperature and then filtered. Analysis of the filtrate showed that the platinum catalyst had been removed. Examples 17, 19, 22, 26, 27, 41, 43, 45, 47, 49 and 51-54 were equally effective in the above test.

EXAMPLE 74

The product from Example 40 (0.12 g) was added to a sample (2 ml) of a deep yellow solution of tetra(triphenylphosphine) palladium(0) (0.02 g) in THF (25 ml). The mixture was stirred for 10 min at room temperature and then filtered. Analysis of the filtrate showed that the palladium had been removed. Examples 17, 19, 22, 26, 27, 41, 43, 45, 47, 49 and 51-54 were equally effective in the above test.

EXAMPLE 75

The product from Example 13 (0.12 g) was added to a sample (2 ml) of an aqueous solution of silver (I) nitrate (0.1 M) in water. The mixture was stirred for 10 min at room temperature and then filtered. Analysis of the filtrate showed that silver ions had been removed. Examples 17, 19, 22, 26, 27, 41, 43, 45, 47, 49 and 51-54 were equally effective in the above test.

EXAMPLE 76

The product from Example 40 (0.12 g) was added to a sample (2 ml) of a solution of rhodium (III) chloride (0.02 g) in water (25 ml). The mixture was stirred for 1 h at room temperature and then filtered. Analysis of the filtrate showed that the rhodium catalyst had been removed. Examples 17, 19, 22, 26, 27, 41, 43, 45, 47, 49 and 51-54 were equally effective in the above test.

EXAMPLE 77

The product from Example 17 (0.12 g) was added to a sample (2 ml) of a solution of cupric (II) chloride (1000 ppm) in THF. The mixture was stirred for 1 h at room temperature and then filtered. Analysis of the filtrate showed that cupric chloride had been removed.

EXAMPLE 78

The product from Example 40 (0.12 g) was added to a sample (2 ml) of a solution of ferric (III) chloride (1000 ppm) in water. The mixture was stirred for 1 h at room temperature and then filtered. Analysis of the filtrate showed that ferric chloride had been removed.

EXAMPLE 79

A mixture of anisole (0.035 g, 0.33 mmol) as a marker, benzylamine (0.041 g, 0.38 mmol) and the product from Example 12 (0.65 g, 1.2 mmol) was stirred in $CDCl_3$ (2.5 $cm^3$) at room temperature for 1 h. The mixture was then centrifuged and a $^1H$ NMR spectrum of the chloroform solution showed that the benzylamine was completely removed.

A mixture of anisole (0.02860 g, 0.26 mmol), hexylamine (0.02504 g, 0.25 mmol) and the product from Example 16 (0.5 g, 1.0 mmol) was stirred in $CDCl_3$ (2.5 $cm^3$) at room temperature for 1 h. The mixture was then centrifuged and a $^1H$ NMR spectrum of the chloroform solution showed that the hexylamine was completely removed.

EXAMPLE 80

A mixture of anisole (0.031 g, 0.28 mmol), ethyl chloroformate (0.027 g, 0.25 mmol) and the product from Example 17 (0.59 g, 1.11 mmol) was stirred in $CDCl_3$ (2.5 $cm^3$) at room temperature for 1.5 h. The mixture was then centrifuged and a $^1H$ NMR spectrum of the chloroform solution showed that the ethyl chloroformate was completely removed.

EXAMPLE 81

A mixture of anisole (0.031 g, 0.29 mmol), benzaldehyde (0.031 g, 0.3 mmol) and the product from Example 18 (0.47 g, 1.19 mmol) was stirred in $CDCl_3$ (2.5 $cm^3$) for 1.5 h. The mixture was then centrifuged and a $^1H$ NMR spectrum of the solution showed that the benzaldehyde was completely removed.

EXAMPLE 82

A mixture of dimethoxyethane (0.03304 g, 0.37 mmol), benzoyl chloride (0.046 g, 0.33 mmol) and the product from Example 17 (0.52, 1.3 mmol) was stirred in $CDCl_3$ (2.5 $cm^3$) at room temperature for 1.5 h. The mixture was then centrifuged and a $^1H$ NMR spectrum of the chloroform solution showed that the benzoyl chloride was completely removed.

EXAMPLE 82

A mixture of dimethoxyethane (0.022 g, 0.25 mmol), phenyl isocyanate (0.029 g, 0.24 mmol) and the product from Example 17 (0.45 g, 0.97 mmol) was stirred in $CDCl_3$ (2.5 $cm^3$) at room temperature for 1.5 h. The mixture was then centrifuged and a $^1H$ NMR spectrum of the chloroform solution showed that the phenyl isocyanate was completely removed.

EXAMPLE 83

A mixture containing para toluenesulfonic acid (0.0265 g, 0.14 mmol) and the product from Example 19 (0.44 g, 0.11 mmol) in ether (10 ml) was stirred at room temperature for 1 h and then filtered. The filtrate was concentrated and the residued weighted. Greater then 95% of the para toluenesulfonic acid was removed.

EXAMPLE 84

A mixture containing para toluenesulfonic acid (0.019 g, 0.1 mmol) and the product from Example 27 (0.54 g, 0.10 mmol) in ether (10 ml) was stirred at room temperature for 1 h and then filtered. The filtrate was concentrated and the residue weighted. Greater then 95% of the para toluenesulfonic acid was removed.

EXAMPLE 85

A mixture of acetophenone (6 g, 50 mmol), ethylene glycol (6 ml) and the product from Example 55 or 66 or 68 (0.2 g) in toluene (40 ml) was refluxed under a Dean and Stark condenser for 4 h. The reaction mixture was cooled, filtered and washed with water (3×50 ml) and then dried over magnesium sulphate. On concentration 1-methyl-1-phenyl 1,3 dioxolane was obtained in 95% yield. M.p. 61° C.; lit. 61-62° C.

EXAMPLE 86

A mixture of 1-phenyl-1-propanol (2 mmol) and the product from Example 55 or 66 or 68 (30 mg) in toluene (2 ml) was stirred and heated at 75° C. for 10 h under nitrogen. Ether (20 ml) was added and the mixture was filtered to remove the catalyst. The organic washings were concentrated under reduced pressure at room temperature to afford β-methyl styrene as a colourless oil (95%).

EXAMPLE 87

A mixture containing the product from Example 55 or 66 or 68 (0.05 g) and oleic acid (1.41 g, 5 mmol) and ethanol (10 ml) was refluxed with stirring for 4 h. On cooling ether (30 ml) was added and the catalyst was filtered off. The organic washings were combined and concentrated to give ethyl oleate (90% yield).

EXAMPLE 88

The product from Example 26 (0.12 g) was added to a sample (2 ml) of a deep yellow solution of bis(triphenyl-phosphine)-dicarbonyl nickel(0) (0.02 g) in THF (25 ml). The mixture was stirred for 10 min at room temperature and then filtered. Analysis of the filtrate showed that the nickel had been removed. Examples 13, 27, 40, 41, 43, 47, 49 and 51-54 were equally effective in the above test.

EXAMPLE 89

A mixture of the palladium catalyst formed in Example 34 (50 mg), 4-bromotoluene (1.6 mmol), phenyl boronic acid (1.6 mmol) and potassium carbonate (2.4 mmol) in xylene (10 ml) was warmed at 110° C. with stirring for 1 hour. The mixture was filtered and the solid washed with ether. The combined organic extracts were washed with water, dried and then concentrated to give 4-methyl biphenyl in 99% yield.

The filtered solid was returned to the reaction flask and further 4-bromotoluene (1.6 mmol), phenyl boronic acid (1.6 mmol) and potassium carbonate (2.4 mmol) in xylene (10 ml) was added and the process repeated to give 4-methyl biphenyl in 99% yield.

The above was repeated with 4-bromo anisole, 4-iodo chlorobenzene or 4-bromobenzene in place of 4-bromotoluene. The yield of the corresponding biphenyl product was greater than 95% in each case.

The invention claimed is:
1. A compound of Formula 1:

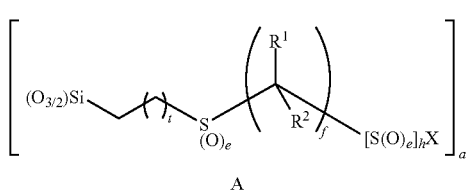

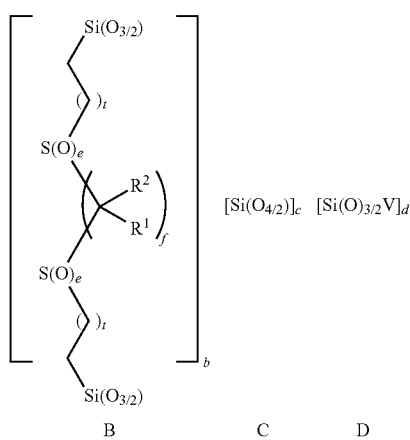

wherein

X is selected from $R^1$, a group —[$CO_2(CH_2)_nCO_2$]— linking two moieties $A^1$, $A^1$ being moiety A without X and n being 2 to 4, C(=W)R, $(CR^3Z)_tCHR^3Z$, OH, $O(M^{+g})_{1/g}$ and OC(=W)R where W is selected from oxygen, sulfur, $NR^4$ and $NNR^4R^5$, Z is selected from OH, $NR^6R^7$ and $SR^6$, R is selected from $R^6$, OH, $O(M^{+g})_{1/g}$, $NR^6R^7$, $NHNR^6R^7$ and $SR^6$, with the proviso that C(=W)R is not C(=O)OC(CH_3)_3, and $R^1$, $R^2$, $R^3$, $R^4$, $R^5$, $R^6$ and $R^7$ are each selected from hydrogen, an optionally substituted linear or branched $C_{1-40}$-alkyl, $C_{2-40}$-alkenyl, $C_{2-40}$-alkynyl group, an aryl and $C_{1-40}$-alkylaryl group; M is a metal ion derived from a lanthanide, actinide, main group or transition metal and V is an optionally substituted $C_{1-40}$-alkyl, $C_{2-40}$-alkenyl or $C_{2-40}$-alkynyl group or an aryl group and $C_{1-40}$-alkylaryl sulfide, sulfoxide, sulfone, amine or a polyalkyl amine or phosphine or other phosphorous containing group, wherein when a substituent is present it is a monovalent substituent selected from the group consisting of nitro, chloro, fluoro, bromo, nitrile, hydroxyl, carboxylic acids, carboxylic acid esters, sulfide, sulfoxide, $C_{1-6}$-alkoxy, a $C_{1-40}$-alkyl or aryl di substituted phosphine, amino, amino $C_{1-40}$-alkyl group and amino di ($C_{1-40}$-alkyl) group;

e is an integer from 0 to 2;
f is an integer from 1 to 100,
g is an integer from 1 to 4,
i is an integer from 0 to 6,
t is an integer from 1 to 20; and
h is 0 or 1;

the free valences of the silicate oxygen atoms are saturated by one or more of:
silicon atoms of other groups of Formula 1,
hydrogen,
a linear or branched $C_{1-12}$-alkyl group,
$R^8{}_3M^1O_{1/2}$,
a cross-linking bridge members,
$R^8{}_qM^1(OR^9)_mO_{k/2}$,
$Al(OR^9)_{3-p}O_{p/2}$, or
$R^8Al(OR^9)_{2-r}O_{r/2}$;
wherein
$M^1$ is Si or Ti;
$R^9$ is a linear or branched $C_{1-40}$ alkyl group an aryl or $C_{1-40}$-alkylaryl group; and
$R^8$ is a linear or branched $C_{1-40}$-alkyl group or an aryl or $C_{1-40}$-alkylaryl group;
k is an integer from 1 to 3 and q is an integer from 1 to 2 and m is an integer from 0 to 2;
such that m+k+q=4;
p is an integer from 1 to 3; and r is an integer from 1 to 2;
or other known oxo metal bridging systems where the metal is zirconium, boron, magnesium, iron, nickel or a lanthanide;
a, b, c and d in Formula 1 are integers such that i) when b is 0 the ratio of a:c varies from 0.00001 to 100,000 and in the formula $A_aB_bC_cD_d$ both A and C are always present, and ii) when b is 1 or more the ratio of a:b varies from 0.00001 to 100,000 and in the formula $A_aB_bC_cD_d$ both A and B are always present.

2. A compound as claimed in claim 1 which includes an end group and/or cross linking bridge member and/or polymer chain and wherein the ratio of an end group and/or cross linker and/or polymer chain to a+b+c+d varies from 0 to 999:1.

3. A compound as claimed in claim 1 that includes an end group derived from a trialkyl or triaryl alkoxysilane or a cross linking bridge member derived from an orthosilicate, a titanium alkoxide or an aluminium trialkoxide or a polymer chain derived from a mono alkyl or mono aryl trialkoxysilane or a di alkyl or di aryl dialkoxysilane.

4. A compound as claimed in claim 1 wherein one or more end groups or cross linking bridges or polymer chains are selected from $R^8{}_2Si(OR^9)O_{1/2}$, $R^8{}_3SiO_{1/2}$ or $R^8{}_2SiO_{2/2}$ or $TiO_{4/2}$, or $R^8TiO_{3/2}$ or $R^8{}_2TiO_{2/2}$ or $AlO_{3/2}$ or $R^8AlO_{2/2}$.

5. A compound as claimed in claim 4 wherein $R^8$ is independently selected from linear or branched $C_{1-22}$-alkyl, aryl and a $C_{1-22}$-alkylaryl group.

6. A compound as claimed in claim 5 wherein $R^8$ is $C_{1-6}$-alkyl, $C_{2-12}$-alkenyl or aryl.

7. A compound as claimed in claim 1 comprising a metal complex $M(L)_j$ where M is derived from a lanthanide, actinide, main group or transition metal with oxidation states ranging from zero to four and L is one or more optionally substituted ligands selected from halide, nitrate, acetate, carboxylate, cyanide, sulfate, carbonyl, imine, alkoxy, triaryl or trialkylphosphine and phenoxy and j is an integer from 0 to 8 and where the compound of Formula 1 is linked to the said metal complex.

8. A compound as claimed in claim 1 comprising a metal complex $M(L)_j$ where M is derived from cobalt, manganese, iron, nickel, palladium, platinum, rhodium, with oxidation states ranging from zero to four and L is one or more optionally substituted ligands selected from halide, nitrate, acetate, carboxylate, cyanide, sulfate, carbonyl, imine, alkoxy, triaryl or trialkylphosphine and phenoxy and j is an integer from 0 to 4 and where the compound of Formula 1 is linked to the said metal complex.

9. A compound as claimed in claim 1 wherein X is selected from $R^1$, C(=W)R or $(CR^3Z)_iCHR^3Z$ or OH or $O(M^{+g})_{1/g}$ where W is oxygen, Z is OH, $SR^6$, or $NR^6R^7$ and R is $R^6$, OH, $O(M^{+g})_{1/g}$, $NR^6R^7$, $NHNR^6R^7$ or $SR^6$ and $R^1$, $R^2$, $R^3$, $R^4$, $R^5$, $R^6$ and $R^7$ are each hydrogen, an optionally substituted linear or branched $C_{1-20}$-alkyl, $C_{2-20}$-alkenyl or $C_{2-20}$-alkynyl group, an aryl or $C_{1-20}$-alkylaryl group, M is a metal ion derived from a lanthanide, actinide, main group or transition metal and V is an optionally substituted $C_{1-20}$-alkyl, $C_{2-20}$-alkenyl or $C_{2-20}$-alkynyl group or an aryl group or $C_{1-20}$-alkylaryl sulfide, sulfoxide, sulfone, amine or a polyalkyl amine or phosphine or other phosphorous containing group, and e is an integer from 0 to 2; f is an integer from 1 to 20, g is an integer from 1 to 4, i is an integer from 0 to 6 and h is 0 to 1.

10. A compound as claimed in claim 9 wherein X is selected from $R^1$, C(=W)R or $(CR^3Z)_iCHR^3Z$ or OH where W is oxygen, Z is OH, $SR^6$, or $NR^6R^7$, and R is $R^6$, OH, $O(M^{+g})_{1/g}$, $NR^6R^7$, $NHNR^6R^7$ or $SR^6$ and $R^1$, $R^2$, $R^3$, $R^4$, $R^5$, $R^6$ and $R^7$ are each hydrogen, an optionally substituted linear or branched $C_{1-12}$-alkyl, $C_{2-6}$-alkenyl or $C_{2-6}$-alkynyl group, an aryl or $C_{1-12}$-alkylaryl group, M is a metal ion derived from a lanthanide, main group or transition metal and V is an optionally substituted $C_{1-6}$-alkyl, $C_{2-6}$-alkenyl or $C_{2-6}$-alkynyl group or an aryl group, and e is an integer from 0 to 2; f is an integer from 1 to 6, g is an integer from 1 to 4, i is an integer from 0 to 2 and his 0 to 1.

11. A compound as claimed in claim 10 wherein X is selected from C(=W)R or $(CR^3Z)_iCHR^3Z$ where W is oxygen, Z is OH and R is OH, $O(M^{+g})_{1/g}$, $NR^6R^7$ or $SR^6$ and $R^1$, $R^2$, $R^3$, $R^4$, $R^5$, $R^6$ and $R^7$ are each hydrogen, an optionally substituted linear or branched $C_{1-12}$-alkenyl $C_{2-6}$-alkynyl or $C_{2-6}$-alkynyl group, an aryl or $C_{1-12}$-alkylaryl group, M is a metal ion derived from a lanthanide, main group or transition metal and V is an optionally substituted $C_{1-6}$-alkyl, $C_{2-6}$-alkenyl or $C_{2-6}$-alkynyl group or an aryl group, and f is an integer from 1 to 6, g is an integer from 1 to 4, i is an integer from 0 to 2 and e and h are 0.

12. A compound as claimed in claim 11 containing a metal complex $M(L)_j$ where M is derived from cobalt, manganese, nickel, palladium, platinum, rhodium, with oxidation states ranging from zero to four and L is one or more optionally substituted ligands such as halide, nitrate, acetate, carboxylate, cyanide, sulfate, carbonyl, imine, alkoxy, triaryl or trialkylphosphine and phenoxy and j is an integer from 0 to 4.

13. A compound as claimed in claim 9 wherein X is $R^1$ and $R^1$ are each hydrogen, an optionally substituted linear or branched $C_{1-12}$-alkyl, $C_{2-6}$-alkenyl or $C_{2-6}$-alkynyl group, an aryl or $C_{1-12}$-alkylaryl group, V is an optionally substituted $C_{1-6}$-alkyl, $C_{2-6}$-alkenyl or $C_{2-6}$-alkynyl group or an aryl group, and e is an integer from 0 to 2; f is an integer from 1 to 6 and h is 0 to 1.

14. A compound as claimed in claim 13 wherein X is an aryl group containing one or more sulfonic acid groups, V is an optionally substituted $C_{1-6}$-alkyl, $C_{2-6}$-alkenyl or $C_{2-6}$-alkynyl group or an aryl group, and e is an integer from 0 to 2; f is an integer from 1 to 6 and h is 0.

15. A compound as claimed in claim 9 wherein the free valences of the silicate oxygen atoms are saturated by one or more of silicon atoms of other groups of Formula 1, hydrogen, a linear or branched $C_{1-6}$ alkyl group or by end groups $R^8_3SiO_{1/2}$ or by cross-linking bridge members or by polymer chains $R^8_qSiO_{k/2}$ where $R^8$ is a linear or branched $C_{1-4}$ alkyl group; k is an integer from 2 to 3 and q is an integer from 1 to 2; such that k+q=4; and a, b, c and d are integers such that i) when b is 0 the ratio of a:c varies from 0.00001 to 100,000 and in the formula $A_aB_bC_cD_d$ both A and C are always present and ii) when b is 1 or more that the ratio of a:b varies from 0.00001 to 100,000 and in the formula $A_aB_bC_cD_d$ both A and B are always present and the ratio of end groups and/or cross linkers and/or polymer chains to a+b+c+d varies from 0 to 999:1.

16. A compound as claimed in claim 15 wherein a, b, c and d are integers such that i) when b is 0 the ratio of a:c varies from 0.01 to 100 and in the formula $A_aB_bC_cD_d$ both A and C are always present and ii) when b is 1 or more that the ratio of a:b varies from 0.01 to 100 and in the formula $A_aB_bC_cD_d$ both A and B are always present and the ratio of end groups and/or cross linkers and/or polymer chains to a+b+c+d varies from 0 to 99:1.

17. A compound as claimed in claim 16 wherein a, b, c and cl are integers such that i) when b is 0 the ratio of a:c is from 0.01 to 5 and in the formula $A_aB_bC_cD_d$ both A and C are always present and ii) when b is 1 or more that the ratio of a:b is from 0.01 to 5 and in the formula $A_aB_bC_cD_d$ both A and B are always present and the ratio of end groups and/or cross linkers and/or polymer chains to a+b+c+d is from 0 to 10:1.

18. An anti-microbial composition comprising a compound as claimed in claim 1 and a carrier.

19. A compound of Formula 1:

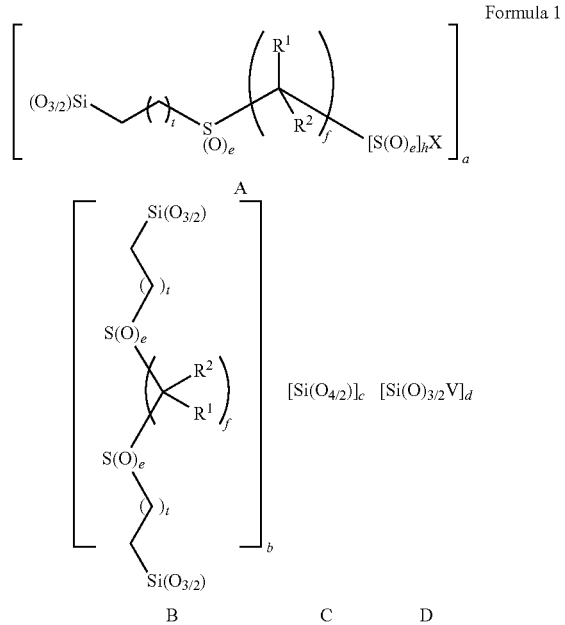

wherein
X is selected from $R^1$, a group —[$CO_2(CH_2)_nCO_2$]— linking two moieties $A^1$, $A^1$ being moiety A without X and n being 2 to 4, C(=W)R, $(CR^3Z)_iCHR^3Z$, OH, $O(M^{+g})_{1/g}$, and OC(=W)R where W is selected from oxygen, sulfur, $NR^4$ and $NNR^4R^5$, Z is selected from OH, $NR^6R^7$ and $SR^6$, R is selected from $R^6$, OH, $O(M^{+g})_{1/g}$, $NR^6R^7$, $NHNR^6R^7$ and $SR^6$ and $R^1$, $R^2$, $R^3$, $R^4$, $R^5$, $R^6$ and $R^7$ are each selected from hydrogen, an optionally substituted linear or branched $C_{1-40}$-alkyl, $C_{2-40}$-alkenyl, $C_{2-40}$-alkynyl group, an aryl and $C_{1-40}$-alkylaryl group; M is a metal ion derived from a lanthanide, actinide, main group or transition metal and V is an optionally substituted $C_{1-40}$-alkyl, $C_{2-40}$-alkenyl or $C_{2-40}$-alkynyl group or an aryl group and $C_{1-40}$-alkylaryl sulfide, sulfoxide, sulfone, amine or a polyalkyl amine or phosphine or other phosphorous containing group, wherein when a substituent is present it is a monovalent substituent selected from the group consisting of nitro, chloro, fluoro, bromo, nitrile, hydroxyl, carboxylic acids, carboxylic acid esters, sulfide, sulfoxide, $C_{1-6}$-alkoxy, a $C_{1-40}$-alkyl or aryl di substituted phosphine, amino, amino $C_{1-40}$-alkyl group and amino di ($C_{1-40}$-alkyl) group;

e is an integer from 0 to 2;

f is an integer from 1 to 100, g is an integer from 1 to 4, i is an integer from 0 to 6, t is an integer 1 or from 3 to 20; and h is 0 or 1;

the free valences of the silicate oxygen atoms are saturated by one or more of:

silicon atoms of other groups of Formula 1, hydrogen, a linear or branched $C_{1-12}$-alkyl group, $R^8_3 M^1 O_{1/2}$, a cross-linking bridge members, $R^8_q M^1 (OR^9)_m O_{k/2}$, $Al(OR^9)_{3-p} O_{p/2}$, or $R^8 Al(OR^9)_{2-r} O_{r/2}$;

wherein $M^1$ is Si or Ti;

$R^9$ is a linear or branched $C_{1-40}$ alkyl group an aryl or $C_{1-40}$-alkylaryl group; and $R^8$ is a linear or branched $C_{1-40}$-alkyl group or an aryl or $C_{1-40}$-alkylaryl group;

k is an integer from 1 to 3 and q is an integer from 1 to 2 and in is an integer from 0 to 2;

such that m+k+q=4;

p is an integer from 1 to 3; and r is an integer from 1 to 2;

or other known oxo metal bridging systems where the metal is zirconium, boron, magnesium, iron, nickel or a lanthanide;

a, b, c and d in Formula 1 are integers such that i) when b is 0 the ratio of a:c varies from 0.00001 to 100,000 and in the formula $A_a B_b C_c D_d$ both A and C are always present, and ii) when b is 1 or more the ratio of a:b varies from 0.00001 to 100,000 and in the formula $A_a B_b C_c D_d$ both A and B are always present.

20. A compound of Formula 1:

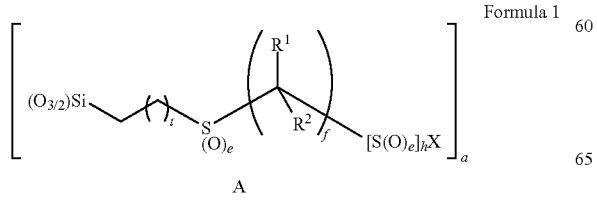

Formula 1

A

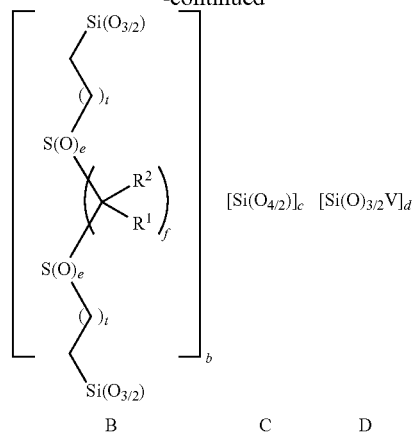

B     C     D wherein

X is selected from $R^1$, a group —[$CO_2(CH_2)_n CO_2$]— linking two moieties $A^1$, $A^1$ being moiety A without X and n being 2 to 4, C(=W)R, $(CR^3 Z)_i CHR^3 Z$, OH, $O(M^{+g})_{1/g}$ and OC(=W)R where W is selected from oxygen, sulfur $NR^4$ and $NNR^4 R^5$, Z is selected from OH, $NR^6 R^7$ and $SR^6$, R is selected from $R^6$, OH, $O(M^{+g})_{1/g}$, $NR^{67}$, $NHNR^6 R^7$ and $SR^6$ and $R^1$, $R^2$, $R^3$, $R^4$, $R^5$, $R^6$ and $R^7$ are each selected from hydrogen, an optionally substituted linear or branched $C_{1-40}$-alkyl, $C_{2-40}$-alkenyl, $C_{2-40}$-alkynyl group, an aryl and $C_{1-40}$-alkylaryl group; M is a metal ion derived from a lanthanide, actinide, main group or transition metal and V is an optionally substituted $C_{,1-40}$-alkyl, $C_{2-40}$-alkenyl or $C_{2-40}$-alkynyl group or an aryl group and $C_{1-40}$-alkylaryl sulfide, sulfoxide, sulfone, amine or a polyalkyl amine or phosphine or other phosphorous containing group, wherein when a substituent is present it is a monovalent substituent selected from the group consisting of nitro, chloro, fluoro, bromo, nitrile, hydroxyl, carboxylic acids, carboxylic acid esters, sulfide, sulfoxide, $C_{1-6}$-alkoxy, a $C_{1-40}$-alkyl or aryl di substituted phosphine, amino, amino $C_{1-40}$-alkyl group and amino di ($C_{1-40}$-alkyl) group;

e is an integer from 0 to 2;

f is an integer from 1 to 100, g is an integer from 1 to 4, i is an integer from 0 to 6, t is an integer from 1 to 20; and h is 0 or 1;

the free valences of the silicate oxygen atoms are saturated by one or more of:

silicon atoms of other groups of Formula 1, hydrogen, a linear or branched $C_{1-12}$-alkyl group, $R^8_3 M^1 O_{1/2}$, a cross-linking bridge members, $R^8_q M^1 (OR^9)_m O_{k/2}$, $Al(OR^9)_{3-p} O_{p/2}$, or $R^8 Al(OR^9)_{2-r} O_{r/2}$;

wherein $M^1$ is Si or Ti;

$R^9$ is a linear or branched $C_{1-40}$ alkyl group an aryl or $C_{1-40}$-alkylaryl group; and $R^8$ is a linear or branched $C_{1-40}$-alkyl group or an aryl or $C_{1-40}$-alkylaryl group;

k is an integer from 1 to 3 and q is an integer from 1 to 2 and in is an integer from 0 to 2;

such that m+k+q=4:

p is an integer from 1 to 3; and r is an integer from 1 to 2;

or other known oxo metal bridging systems where the metal is zirconium, boron, magnesium, iron, nickel or a lanthanide;

a, b, c and d in Formula 1 are integers such that i) when b is 0 the ratio of a:c varies from 0.00001 to 100,000 and in the formula $A_aB_bC_cD_d$ both A and C are always present, and ii) when b is 1 or more the ratio of a:b varies from 0.00001 to 100,000 and in the formula $A_aB_bC_cD_d$ both A and B are always present.

21. A compound as claimed in claim 1, wherein $R^1$, $R^2$, $R^3$, $R_4$, $R^5$, $R^6$ and $R^7$ are each selected from hydrogen, a linear or branched $C_{1-40}$-alkyl, $C_{2-40}$-alkenyl or $C_{2-40}$-alkynyl group, an aryl and a $C_{1-40}$-alkylaryl group containing only hydrogen and carbon atoms.

22. A compound as claimed in claim 19, wherein $R^1$, $R^2$, $R^3$, $R^4$, $R^5$, $R^6$ and $R^7$ are each selected from hydrogen, a linear or branched $C_{1-40}$-alkyl, $C_{2-40}$-alkenyl or $C_{2-40}$-alkynyl group, an aryl and a $C_{1-40}$-alkylaryl group containing only hydrogen and carbon atoms.

23. A compound as claimed in claim 20, wherein $R^1$, $R^2$, $R^3$, $R^4$, $R^5$, $R^6$ and $R^7$ are each selected from hydrogen, a linear or branched $C_{1-40}$-alkyl, $C_{2-40}$-alkenyl or $C_{2-40}$-alkynyl group, an aryl and a $C_{1-40}$-alkylaryl group containing only hydrogen and carbon atoms.

* * * * *